(12) United States Patent
Huang et al.

(10) Patent No.: US 12,451,937 B2
(45) Date of Patent: Oct. 21, 2025

(54) DATA BASED PRECODING TECHNIQUES

(71) Applicant: QUALCOMM Incorporated, San Diego, CA (US)

(72) Inventors: Yi Huang, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/220,251

(22) Filed: Apr. 1, 2021

(65) Prior Publication Data

US 2022/0321180 A1   Oct. 6, 2022

(51) Int. Cl.
*H04B 7/0456* (2017.01)
*H04B 7/06* (2006.01)
*H04L 5/00* (2006.01)
*H04L 25/02* (2006.01)

(52) U.S. Cl.
CPC ......... *H04B 7/0456* (2013.01); *H04B 7/0626* (2013.01); *H04L 5/0051* (2013.01); *H04L 25/0242* (2013.01)

(58) Field of Classification Search
USPC ........................................................ 370/329
See application file for complete search history.

(56) References Cited

U.S. PATENT DOCUMENTS

| | | | |
|---|---|---|---|
| 9,042,336 B2 * | 5/2015 | Nordstrom | H04L 25/03343 370/252 |
| 2018/0092002 A1 * | 3/2018 | Manolakos | H04W 72/04 |
| 2018/0167252 A1 * | 6/2018 | Wang | H04B 7/0669 |
| 2019/0296819 A1 * | 9/2019 | Jiang | H04L 1/06 |
| 2019/0341974 A1 * | 11/2019 | Kim | H04W 72/542 |
| 2020/0195315 A1 * | 6/2020 | Wang | H04B 7/0658 |

FOREIGN PATENT DOCUMENTS

| | | | | |
|---|---|---|---|---|
| WO | WO-2020074659 A1 * | 4/2020 | | H04B 7/0469 |
| WO | 2020226539 A1 | 11/2020 | | |

OTHER PUBLICATIONS

Tutorial on Interference Exploitation via Symbol-Level Precoding: Overview, State-of-the-Art and Future Directions (Year: 2020).*

(Continued)

*Primary Examiner* — Luna Weissberger
(74) *Attorney, Agent, or Firm* — Procopio, Cory, Hargreaves & Savitch LLP

(57) ABSTRACT

Data aware precoding techniques are disclosed. A transmitter may apply a precoder function to payload data to obtain a precoded data transmission. The precoder function may include a first portion, e.g., based on a channel measurement, and a second portion, e.g., based on data for transmission. The transmitter may transmit the precoded data transmission. A receiver may receive a precoded data transmission that is precoded based on a channel measurement and based on data comprised in the data transmission. The receiver may decode the precoded data transmission based on the channel measurement and the data comprised in the data transmission.

30 Claims, 15 Drawing Sheets

(56) References Cited

OTHER PUBLICATIONS

International Search Report and Written Opinion—PCT/US2022/016862—ISA/EPO—Jun. 1, 2022.
Li, A., et al., "A Tutorial on Interference Exploitation via Symbol-Level Precoding: Overview, State-of-the-Art and Future Directions", IEEE Communications Surveys & Tutorials, IEEE, USA, vol. 22, No. 2, Mar. 13, 2020 (Mar. 13, 2020), XP011790730, pp. 796-839, DOI: 10.1109/COMST.2020.2980570 [retrieved on May 27, 2020] Sections I-C, II and III, Figures 4-5, Section III equation (46).

* cited by examiner

DATA BASED PRECODING TECHNIQUES

BACKGROUND

Technical Field

The present disclosure relates generally to communication systems, and more particularly, to data aware precoding. Aspects and features enable and provide efficient wireless communication techniques, improved user experience, and devices configured to implement precoder/beamformer selection techniques (e.g., enabling less processing load due to streamlined coding techniques in some deployments and/or mitigating interference).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may apply precoding to payload data to obtain a precoded data transmission. The precoding may include a first portion based on a channel measurement and a second portion based on data for transmission. The apparatus may transmit the precoded data transmission.

In a further aspect of the disclosure, a method, a computer-readable medium, and an apparatus are provided. The apparatus may perform a channel measurement and apply a precoder function to generate a precoded data transmission. The precoder function may include a first portion based on the channel measurement and a second portion based on data to be transmitted. The apparatus may transmit the precoded data transmission.

In another aspect of the disclosure, a method, a computer-readable medium, and an apparatus are provided. The apparatus may receive a precoded data transmission that is precoded based on a channel measurement and based on data comprised in the data transmission. The apparatus may decode the precoded data transmission based on the channel measurement and the data comprised in the data transmission.

In yet another aspect of the disclosure, a method, a computer-readable medium, and an apparatus are provided. The apparatus may receive a reference signal associated with a precoded data transmission and estimate a channel based on the reference signal to determine a first portion of a precoder function applied to the precoded data transmission. The apparatus may further receive information about a second portion of the precoder function that varies per symbol, such that the apparatus may decode the precoded data transmission using the first portion and the second portion of the precoder function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
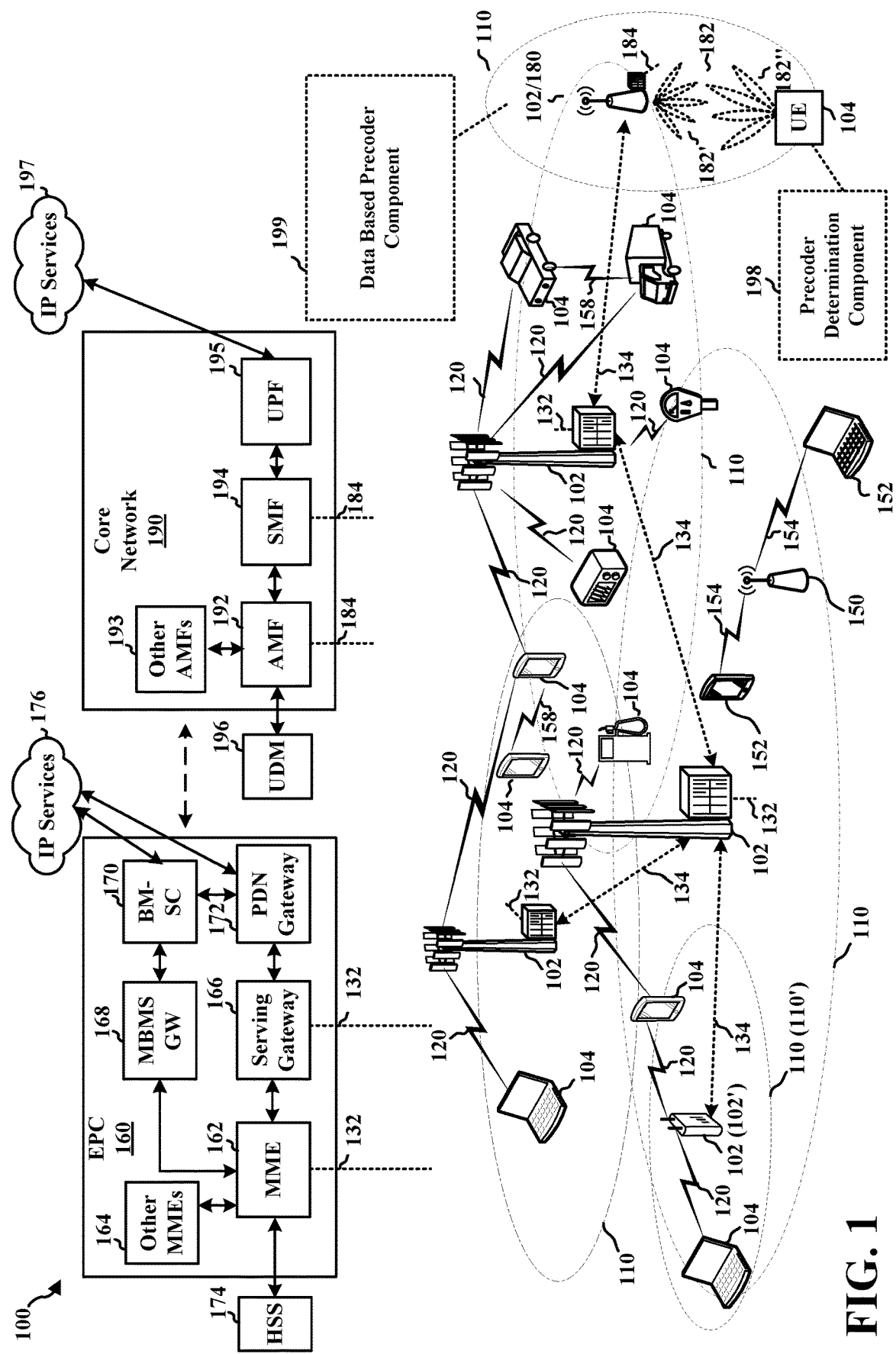
FIG. 1 is a diagram illustrating an example of a wireless communications system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of such types of computer-readable media, or any other medium that can be used to store computer executable code in the form of instructions or data structures that can be accessed by a computer.

A transmitter of wireless communication may account for channel conditions between the transmitter and receiver when generating transmissions. In some aspects, the transmitter or receiver may be a base station. In some aspects, the transmitter or receiver may be a user equipment (UE). The transmitter may perform pre-transmission conditioning (e.g., precoding or beamforming for one or more transmissions). Pre-transmission conditioning can be based on one or more factors, such as channel state information (CSI), e.g., applying an optimal precoder or beamformer based on channel measurements between the transmitter and receiver.

Some aspects presented herein enable precoding or beamforming that is based on the data to be transmitted in addition to channel conditions. As an example, the precoding may include a first portion that is based on CSI and a second portion that is based on data to be transmitted (e.g., content or data confined within one or more particular symbols). In some aspects, a transmitter may determine whether interference will be constructive or destructive for the data to be transmitted. If the interference will be destructive, the transmitter may apply a precoder that either nulls the interference or that adjusts the transmission so that the interference becomes constructive.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiver, such as the UE 104, may include a precoder determination component 198. In a first aspect, the precoder determination component 198 may receive a reference signal associated with a precoded data transmission and estimate a channel based on the reference signal to determine a first portion of a precoder function applied to the precoded data transmission. The precoder determination component 198 may further receive information about a second portion of the precoder function that varies per symbol, such that the precoder determination component 198 may decode the precoded data transmission using the first portion and the second portion of the precoder function. In another aspect, the precoder determination component 198 may receive a precoded data transmission that is precoded based on a channel measurement and based on data comprised in the data transmission. The precoder determination component 198 may decode the precoded data transmission based on the channel measurement and the data comprised in the data transmission.

In certain aspects, a transmitter, such as the base station 102 or 180, may include a data based precoder component 199 configured to perform a channel measurement and apply a precoder function to generate a precoded data transmission. In some aspects, the data based precoder component 199 may be referred to as a data ware precoder component. "Data aware" indicates that the precoder component uses the content of the data payload to precode the data transmission, e.g., applying a particular precoding based on the particular data payload. Thus, "data aware" precoding indicates that the precoding is based on the payload data to be precoded. The precoder function may include a first portion based on the channel measurement and a second portion based on data to be transmitted. The data aware precoder component 199 may be configured to transmit the precoded data transmission. In another aspect, the data based precoder component 199 may apply precoding to payload data to obtain a precoded data transmission. The precoding may include a first portion based on a channel measurement and a second portion based on data for transmission. The data based precoder component 199 may transmit the precoded data transmission. Although the following description may be focused on 5G NR, the concepts described herein may be applicable to other similar areas, such as LTE, LTE-A, CDMA, GSM, and other wireless technologies.

Figure 2:
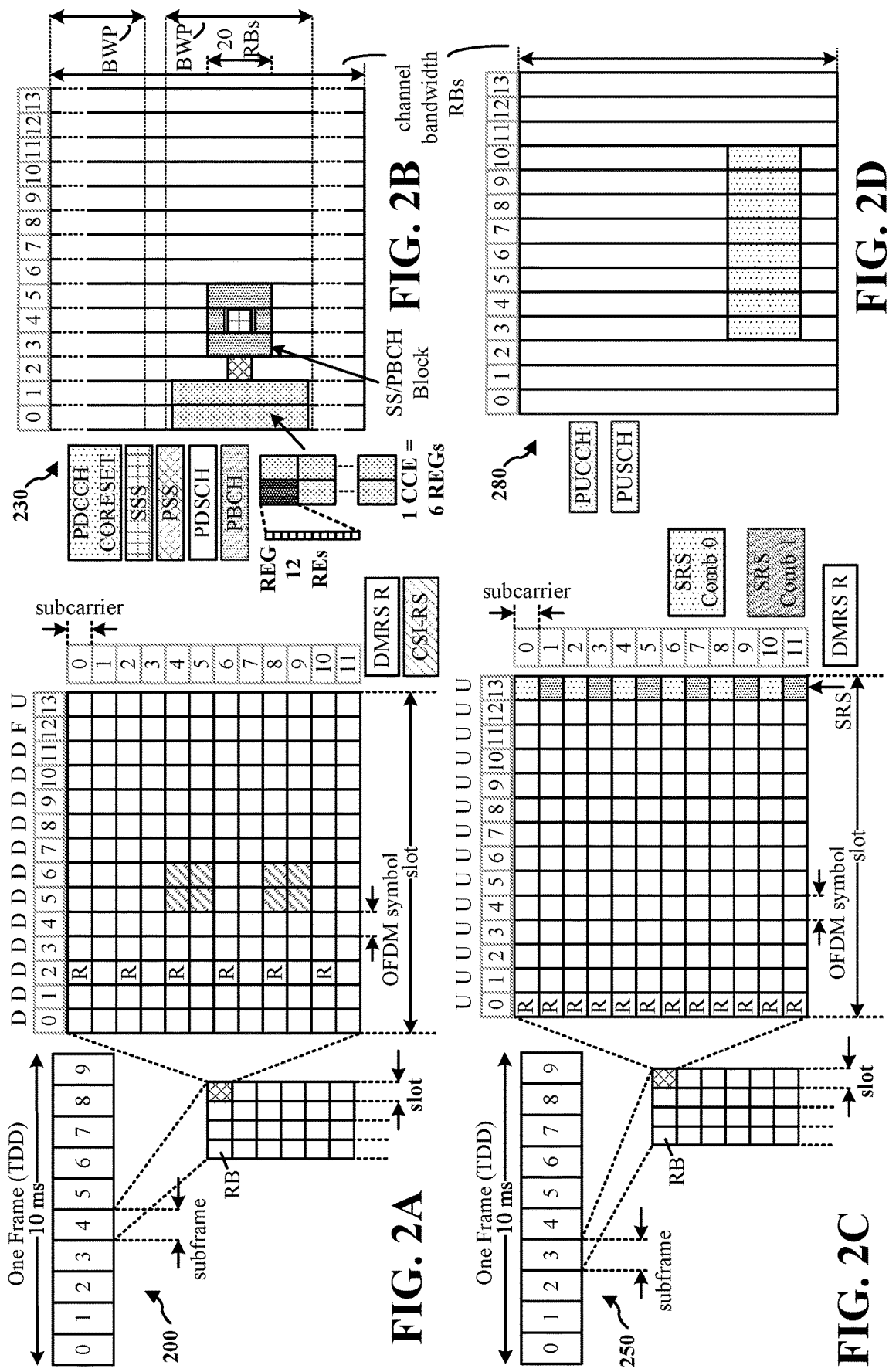
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe.

As illustrated in FIGS. 2A-2D, the 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G NR frame structure that is TDD.

A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
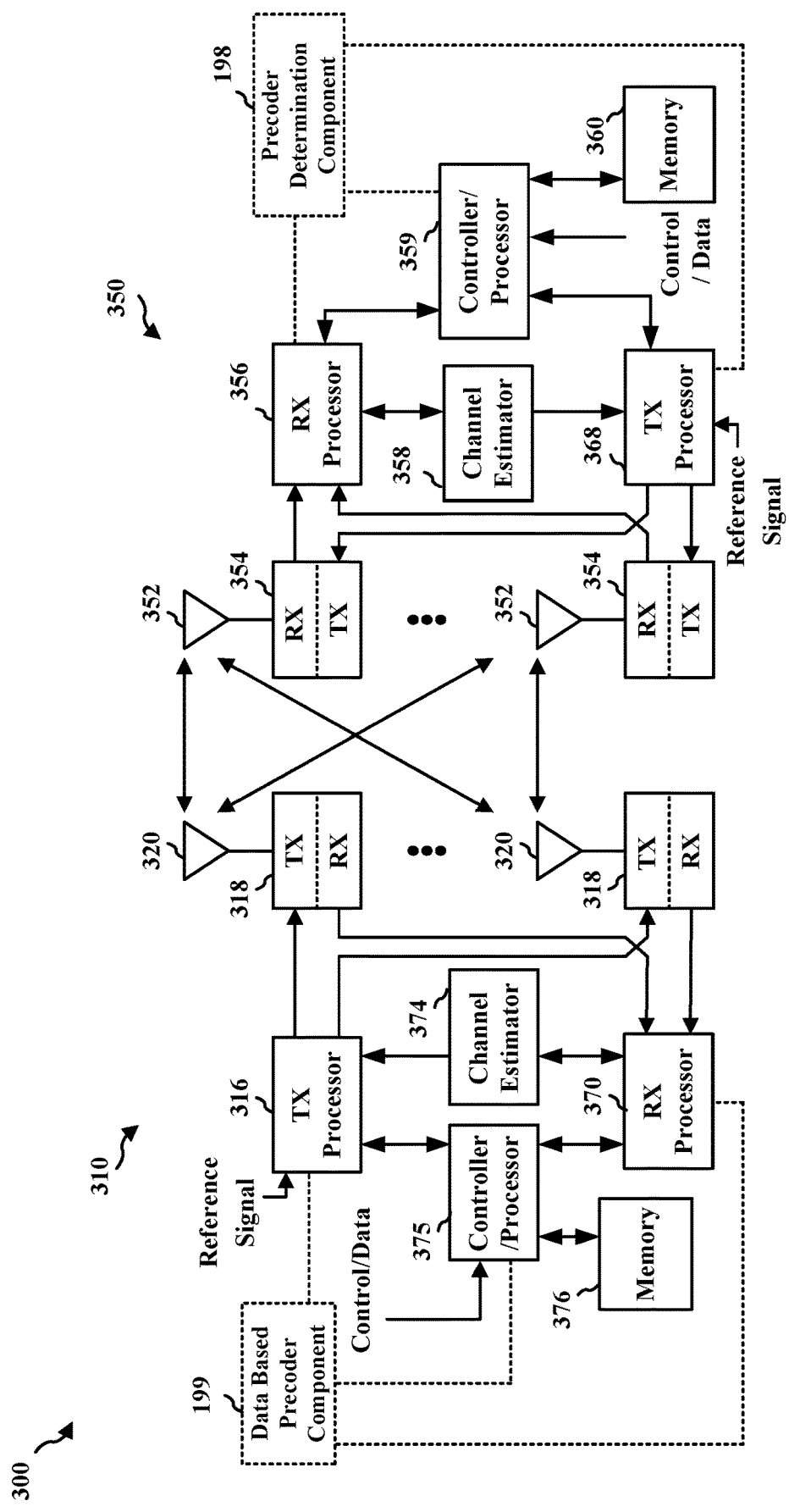
FIG. 3 is a diagram illustrating an example of a base station and user equipment (UE) in an access network in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the precoder determination component 198 of FIG. 1.

At least one of the TX processor 316, the RX processor 370, and the controller/processor 375 may be configured to perform aspects in connection with the data based precoder component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 14:
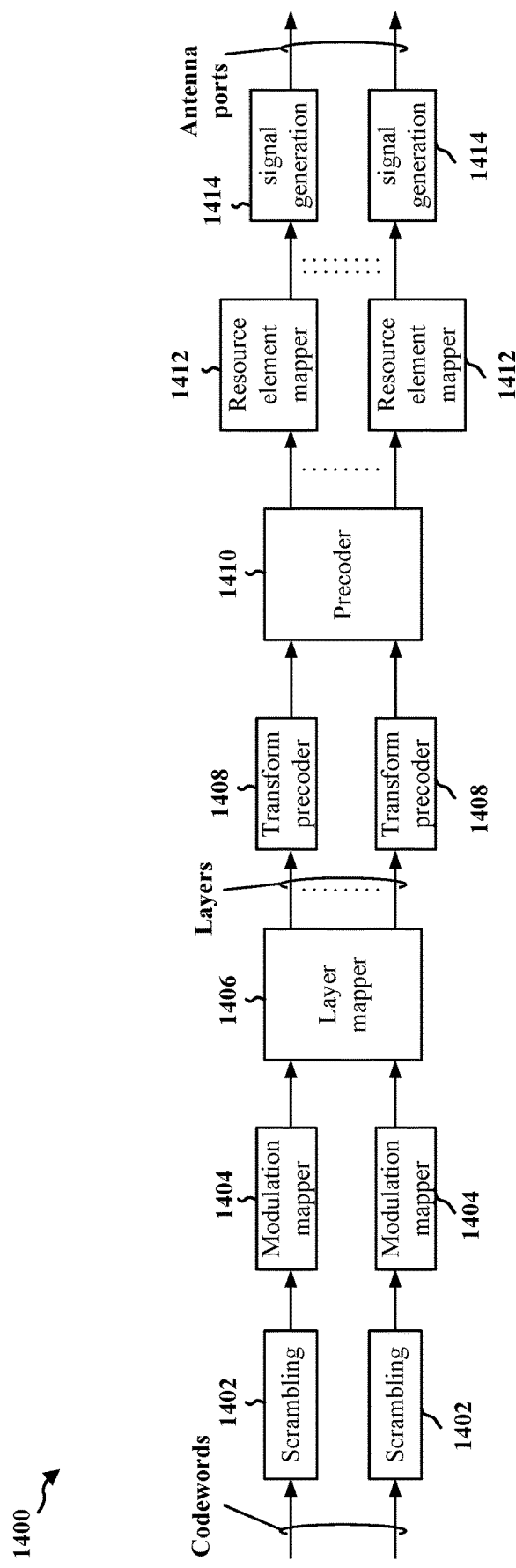
FIG. 14 illustrates example aspects of physical channel processing components for baseband signal generation.

FIG. 14 illustrates an example overview of physical channel processing components 1400 for baseband signal generation. The physical channel processing components may be comprised in the device 310 or 350, e.g., in Tx processor 316 or 368. The baseband signal generation may be used to generate physical channel such as PDSCH, PDCCH, PUSCH, PUCCH, PSSCH, PSCCH, etc. The baseband signal generation may include scrambling of codewords, as illustrated at 1402. For example, a block of bits for a data transmission in a subframe may be scrambled prior to modulation. The scrambling sequence generator may be initialized at the start of each subframe, for example. The scrambled bits may be modulated by the modulation mapper(s) 1404 to generate a block of complex-valued symbols. Example modulation schemes may include QPSK, 16 QAM, 64 QAM, etc. A layer mapper 1406 may map the complex-valued modulation symbols onto one or more transmission layers. The layer mapping may be performed assuming a single antenna port. Transform precoder(s) 1408 may apply transform precoding to generate complex-valued symbols. For example, a block of complex-valued symbols may be divided into sets, each set corresponding to one symbol. Then, transform precoding may be applied resulting in a block of complex valued symbols. A precoder 1410 may perform precoding of the complex-valued symbols. Precoding may be performed assuming a single antenna port or multiple antenna ports. The precoder 1410 may receive a block of vectors from the transform precoder 1408 and generate a block of vectors to be mapped onto resource elements. Then, the block of precoded complex valued symbols may be mapped in sequence to physical resource blocks, e.g., to resource elements, by the resource element mapper(s) 1412. The precoded complex-valued symbols may be mapped in order to physical resource blocks that are assigned for transmission. Then, at 1414, the time-domain signal may be generated for transmission at antenna port(s) based on the mapped resource elements.

As a part of signal generation, a transmitter may apply pre-transmission conditioning, such as precoding. Generally, precoding may be used to distribute information (e.g., data or control information) to be transmitted to one or more antenna ports. A precoder may use a matrix that maps information to one or more of the antenna ports of the transmitter. For example, the precoder may be associated with a MIMO precoding matrix that maps modulated data symbols from a single layer or multiple layers to multiple antennas. As such, the precoder may be different from an encoder for encoding an information bit stream. The precoding/precoder may be implemented as hardware, software, or both, based on an implementation of the transmitter. Table 1 illustrates an example set of precoding matrices for a single layer transmission using two antenna ports. Table 2 illustrates an example set of precoding matrices for a single layer transmission using four antenna ports. Tables 1 and 2 are merely examples to illustrate the concept. The concepts may be applied with different precoding matrices than the examples in Table 1 and 2.

TABLE 1

Precoding matrix W for single layer transmission using two antenna ports $$\frac{1}{\sqrt{2}}\begin{bmatrix}1\\0\end{bmatrix} \quad \frac{1}{\sqrt{2}}\begin{bmatrix}0\\1\end{bmatrix} \quad \frac{1}{\sqrt{2}}\begin{bmatrix}1\\1\end{bmatrix} \quad \frac{1}{\sqrt{2}}\begin{bmatrix}1\\-1\end{bmatrix} \quad \frac{1}{\sqrt{2}}\begin{bmatrix}1\\j\end{bmatrix} \quad \frac{1}{\sqrt{2}}\begin{bmatrix}1\\-j\end{bmatrix} \quad - \quad -$$

TABLE 2

Precoding matrix W for single layer transmission using four antenna ports $$\frac{1}{2}\begin{bmatrix}1\\0\\0\\0\end{bmatrix} \quad \frac{1}{2}\begin{bmatrix}0\\1\\0\\0\end{bmatrix} \quad \frac{1}{2}\begin{bmatrix}0\\0\\1\\0\end{bmatrix} \quad \frac{1}{2}\begin{bmatrix}0\\0\\0\\1\end{bmatrix} \quad \frac{1}{2}\begin{bmatrix}1\\0\\1\\0\end{bmatrix} \quad \frac{1}{2}\begin{bmatrix}1\\0\\-1\\0\end{bmatrix} \quad \frac{1}{2}\begin{bmatrix}1\\0\\j\\0\end{bmatrix} \quad \frac{1}{2}\begin{bmatrix}1\\0\\-j\\0\end{bmatrix}$$

$$\frac{1}{2}\begin{bmatrix}0\\1\\0\\1\end{bmatrix} \quad \frac{1}{2}\begin{bmatrix}0\\1\\0\\-1\end{bmatrix} \quad \frac{1}{2}\begin{bmatrix}0\\1\\0\\j\end{bmatrix} \quad \frac{1}{2}\begin{bmatrix}0\\1\\0\\-j\end{bmatrix} \quad \frac{1}{2}\begin{bmatrix}1\\1\\1\\-1\end{bmatrix} \quad \frac{1}{2}\begin{bmatrix}1\\1\\j\\j\end{bmatrix} \quad \frac{1}{2}\begin{bmatrix}1\\1\\-1\\1\end{bmatrix} \quad \frac{1}{2}\begin{bmatrix}1\\1\\-j\\-j\end{bmatrix}$$

$$\frac{1}{2}\begin{bmatrix}1\\j\\1\\j\end{bmatrix} \quad \frac{1}{2}\begin{bmatrix}1\\j\\j\\1\end{bmatrix} \quad \frac{1}{2}\begin{bmatrix}1\\j\\-1\\-j\end{bmatrix} \quad \frac{1}{2}\begin{bmatrix}1\\j\\-j\\-1\end{bmatrix} \quad \frac{1}{2}\begin{bmatrix}1\\-1\\1\\1\end{bmatrix} \quad \frac{1}{2}\begin{bmatrix}1\\-1\\j\\-j\end{bmatrix} \quad \frac{1}{2}\begin{bmatrix}1\\-1\\-1\\-1\end{bmatrix} \quad \frac{1}{2}\begin{bmatrix}1\\-1\\-j\\j\end{bmatrix}$$

$$\frac{1}{2}\begin{bmatrix}1\\-j\\1\\-j\end{bmatrix} \quad \frac{1}{2}\begin{bmatrix}1\\-j\\j\\-1\end{bmatrix} \quad \frac{1}{2}\begin{bmatrix}1\\-j\\-1\\j\end{bmatrix} \quad \frac{1}{2}\begin{bmatrix}1\\-j\\-j\\1\end{bmatrix} \quad - \quad - \quad - \quad -$$

A transmitter may apply a precoder function to a data transmission, or select between multiple potential precoders, based at least partially on channel conditions between the transmitter and the receiver. In some aspects, a transmitter may be a base station and may receive CSI from a UE. A base station may perform precoding or beamforming for a data transmission to the UE based on the CSI. Aspects presented herein enable precoding or beamforming that is based on the data for transmission, e.g., in addition to channel conditions.

Figure 4:
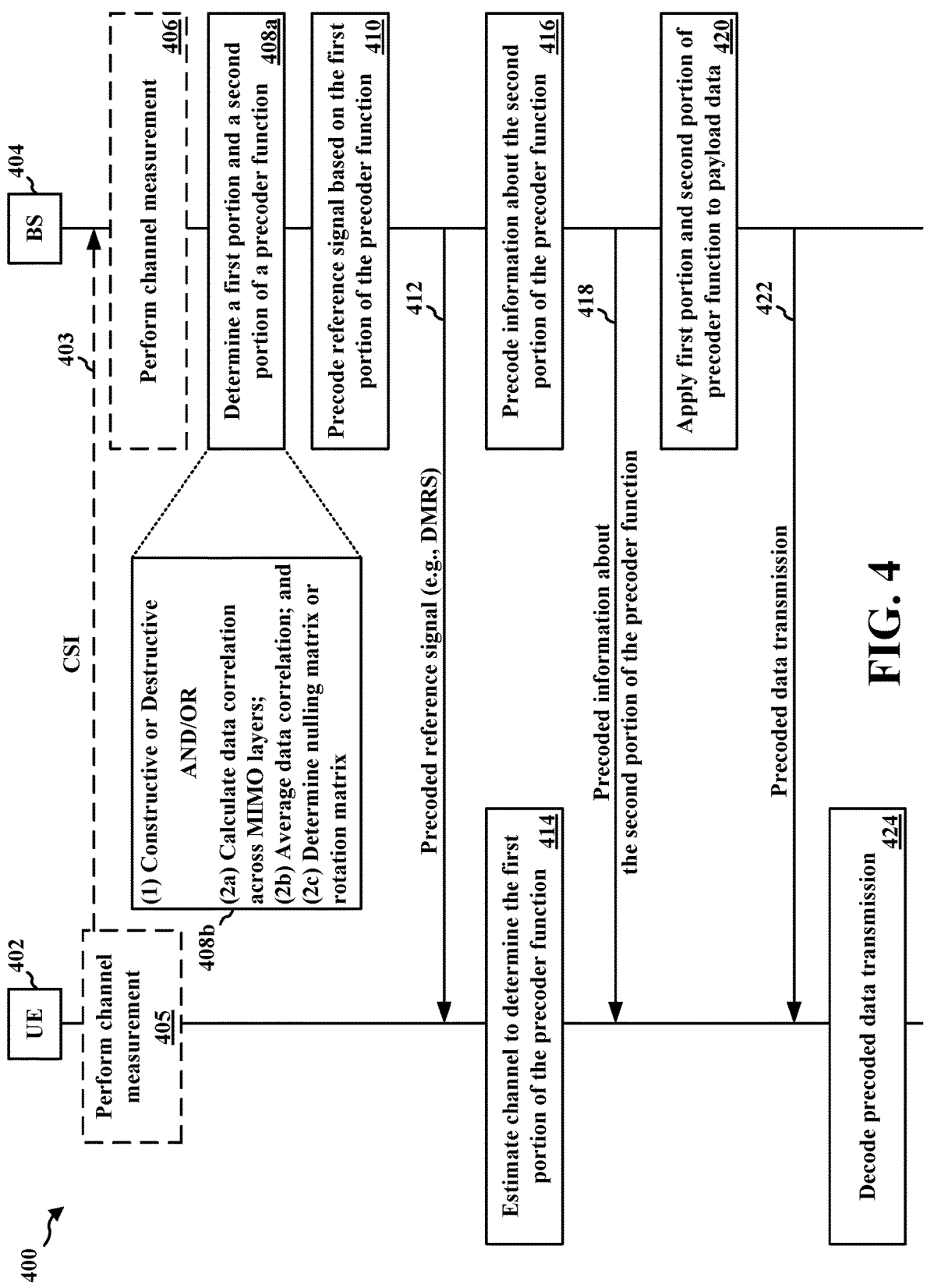
FIG. 4 is a call flow diagram illustrating communications between a UE and a base station in accordance with various aspects of the present disclosure.

FIG. 4 is a call flow diagram 400 illustrating communications between a UE 402 and a base station 404. This call flow shows an example that includes data aware, or data based, precoding features discussed herein. Precoding can be based on one or more factors. As one example, precoding may be based on channel measurements in addition to or alternatively to precoding based on a data payload comprised in the transmission. The transmitter may perform matrix multiplication on an input of the single/multiple layers of modulated symbols to obtain the precoded data. For example, if the modulated symbols correspond to vector D and the precoder corresponds to matrix P, the precoded data may correspond to y=P×D. The output (e.g., vector y) may be mapped to multiple antennas based on the matrix multiplication operation. Accordingly, the precoding may be implemented via matrix multiplication without performing additional buffering. As illustrated at 405, the UE 402 may perform channel measurements, e.g., by performing measurements of one or more reference signals from the base station 404. The UE 402 may perform the measurements for one or more beams. As illustrated at 403, the UE 402 may transmit CSI to the base station based on the measurements performed at 405. Additionally, or alternatively, at 406, the base station 404 may perform a channel measurement based on a signal from the UE 402. One or more of these components may be configured to generate and apply a precoding function (or precoding filter) to or based on a set of information/data/control.

Precoding features can be applied and generated in various manners. In some scenarios, precoding functions may be generated dynamically based on a set of data/information and/or retrieved from memory from previous generation. For example, and as illustrated, at 408a, the base station 404 may determine various portions of a precoding function (e.g., a first portion and a second portion of a precoder function). The multiple portions may be based on one or more various factors such as a function of a channel f(H) and a function of a beta parameter f(b(i)), where i corresponds to data transmitted on an i-th OFDM symbol. In some aspects, for example, a first portion of the precoder function may be based on the channel measurement, e.g., CSI. In aspects, a second portion of the precoder function may be based on data to be transmitted in each symbol of a data transmission. For example, in some deployments, the second portion may be a symbol level precoder function that applies precoding based on the data to be transmitted in each symbol of a slot or subframe in which the data will be transmitted. While not illustrated, additional portions may be included in the precoder function.

To determine, at 408a, the precoder function, the base station 404 may perform, at 408b, one or more operations. For example, the base station 404 may perform, at 408b(1), a first operation, where the base station 404 may determine whether interference at the UE 402 will be constructive or destructive to a data transmission. The base station 404 may determine interference based on the measurements performed at 406 and/or based on the CSI 403 received from the UE 402. As described in additional detail in connection with FIG. 5, the base station 404 may apply data aware precoding based on whether interference is expected to be constructive or destructive to the data. For example, for destructive interference, the base station may apply precoding that will null the interference for the data or that will rotate the transmission relative to the interference to transform the interference into constructive interference.

As an example, if the base station 404 determines, at 408b(1), that the interference will be destructive, the base station 404 may calculate, at 408b(2a), a data correlation across different MIMO layers (e.g., for different tones). In further aspects, the base station 404 may average, at 408b(2b), the data correlation (e.g., to generate a data correlation matrix). In still further aspects, the base station 404 may determine, at 408b(2c), a nulling matrix or a rotation matrix based on the data correlation matrix. In some scenarios, the nulling matrix/rotation matrix may be based on a function that varies on a per symbol basis. The base station 404 may treat the interference either as an inter-UE interference between different downlink MIMO UEs or as an intra-UE interference between different MIMO layers for the same UE. Inter-UE interference may be based on multiple UEs sharing a same RB (e.g., in MU-MIMO examples), whereas intra-UE interference may be based on channel fading that eliminates orthogonality between different MIMO layers of the same UE due to leakage across the different MIMO layers. Data aware/data based precoding may account for such interference when determining the precoder, such that the interference among precoded data layers may be reduced/mitigated.

At 410, the base station 404 may precode a reference signal based on the first portion of the precoder function, where the first portion correspond to the function of the channel f(H). That is, the base station 404 may precode the reference signal based on the channel, e.g., as described in more detail in connection with FIG. 6. At 412, the base station 404 may transmit the precoded reference signal to the UE 402. In some aspects, the precoded reference signal may correspond to a demodulation reference signal (DMRS). The UE 402 may use the precoded reference signal to estimate, at 414, the channel. In some scenarios, the UE 402 may determine the first portion of the precoder function based on the channel estimate.

After the base station 404 transmits, at 412, the precoded reference signal to the UE 402, the base station may also provide the UE with information (e.g., 418) about the second portion of the precoder function. The information 418 may be precoded differently than the data transmission (e.g., 422). For example, the information 418 may be precoded using a first portion of the precoding function, whereas the data transmission may be precoded based on the first portion and the second portion of the precoding function. For example, the base station 404 may precode, at 416, information about the second portion of the precoder function, where the second portion correspond to the function of the beta parameter f(b(i)). The base station 404 may transmit the precoded information about the second portion of the precoder function to the UE 402, at 418. The transmission may include any of the aspects described in connection with FIG. 7A and/or FIG. 7B. At 420, the base station 404 may apply the first portion and the second portion of the precoder function to payload data to be transmitted to the UE 402 and may transmit, at 422, a precoded data transmission to the UE 402. The UE 402 may determine the first portion of the precoder function (e.g., based on f(H)) via the channel estimated, at 414, and determine the precoded information about the second portion of the precoder function (e.g., based on f(b(i))) received, at 418. The UE may use the determined first and second portion of the precoder function to decode, at 424, the precoded data transmission.

Figure 5:
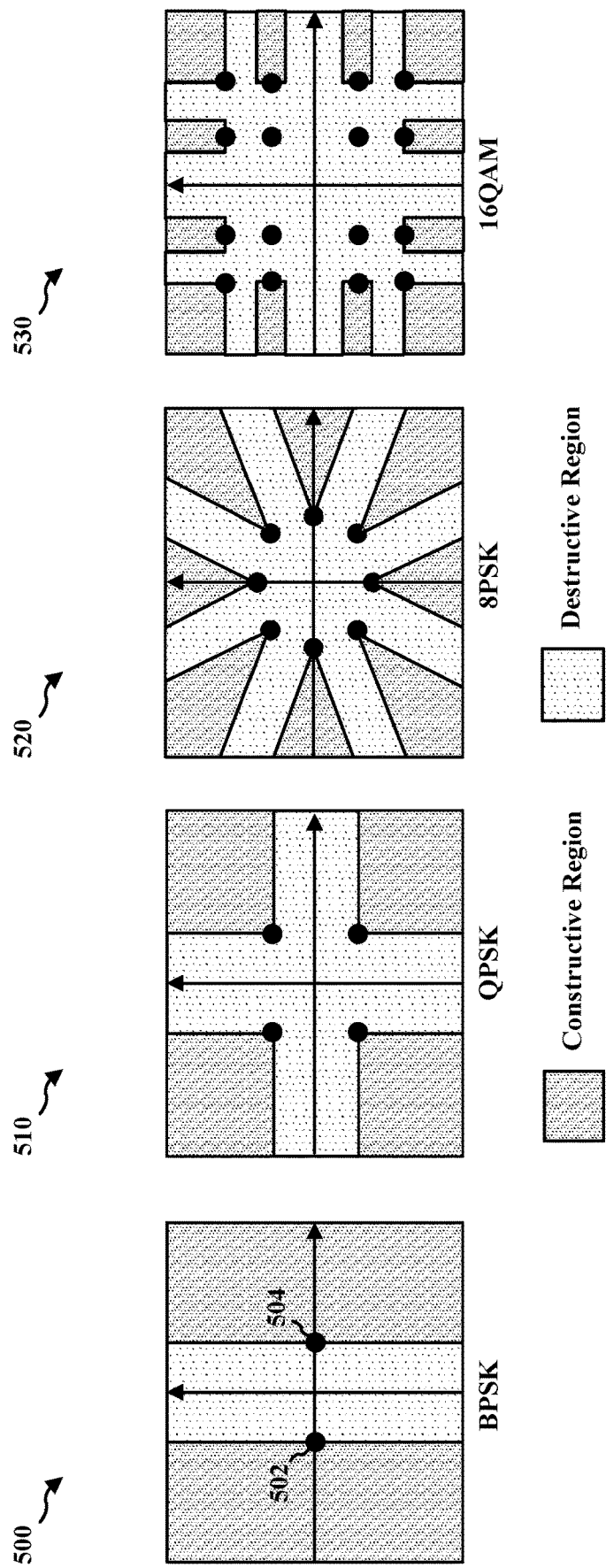
FIG. 5 includes diagrams illustrating regions of constructive interference and destructive interference for different modular orders in accordance with various aspects of the present disclosure.

FIG. 5 includes diagrams 500-530 illustrating regions of constructive interference and destructive interference for different modular orders. As described in connection with 408a and 408b in FIG. 4, a base station 404 may apply precoding to a data transmission based on the data to be transmitted (e.g., at a symbol level). The base station 404 may apply precoding to interference that a UE is expected to experience in communications (e.g., receiving transmission). In some deployments, if a base station serves multiple UEs, the base station may determine a precoder for each of the multiple UEs. Determination of a precoder can be based at least partially on respective channels between a base station and one or more of the multiple UEs in some arrangements. The base station may execute data aware precoding in addition to, or in combination with, determining a precoder function based on the channel. In doing so, a base station may account for interference caused by transmissions between the base station and other UEs and/or between different MIMO layer transmission for a single UE. The base station may apply a second precoder (e.g., a second portion of a precoder function) based at least partially on one or both of the data to be transmitted and the determined interference. The base station may adjust one or more channels based on determined interference from other UEs.

Precoding may be implemented in various manners. As discussed above, precoding can be carried out serially (e.g., one after another). Yet other arrangements are also possible. For example, a base station may also perform the second precoding jointly with the first precoding that is based on the channel. Joint precoding (or parallel precoding) may correspond to a function that includes two inputs (e.g., a first input associated with the channel and a second input associated with data transmissions to/from the other UEs). Such techniques can be used to mitigate or reduce effects that interference may case.

Interference associated with other UEs may negatively impact performance of a UE that is receiving a data transmission from the base station. In some aspects, interference for one MIMO layer of the UE may cause interference to reception of another MIMO layer of the UE. The base station may attempt to cancel or avoid such "destructive" interference whether the interference is associated with a different UE or a different MIMO layer of the same UE. In other aspects, the interference may be "constructive" interference that may strengthen a quality of a signal received by the UE. Different modular orders are illustrated in the diagrams 500-530 that each include a constructive interference region and a destructive interference region. More specifically, the diagram 500 illustrates constructive/destructive interference for BPSK, the diagram 510 illustrates constructive/destructive interference for QPSK, the diagram 520 illustrates constructive/destructive interference for 8 phase shift keying (8PSK), and the diagram 530 illustrates constructive/destructive interference for 16 quadrature amplitude modulation (16QAM).

Referring to the diagram 500, a transmitter (e.g., base station) may transmit a BPSK signal to a receiver (e.g., UE), where the BPSK signal corresponds to either a first point 502 or a second point 504 in a signal space received by the receiver/UE. If the interference corresponds to a location in the constructive interference region for the data to be transmitted, a quality of the received signal, or reception accuracy, may be increased. More specifically, if the data transmission of the transmitter corresponds to the first point 502 and the interference corresponds to a location in the constructive interference region, the interference may cause the first point 502 to be shifted more to the left in the diagram 500, which may increase a distance between the first point 502 corresponding to the received signal and the second point 504 corresponding to another candidate point for transmission. Accordingly, a likelihood that a first signal (e.g., associated with the first point 502) is misinterpreted as a second signal (e.g., associated with the second point 504) may be decreased by adding constructive interference to the received signal.

For destructive interference, if the data transmission of the transmitter corresponds to the first point 502 and the interference corresponds to a location in the destructive interference region, the interference may cause the first point 502 to be shifted closer to the second point 504. Accordingly, the likelihood that the first signal (e.g., associated with the first point 502) is misinterpreted as the second signal (e.g., associated with the second point 504) may be increased via the destructive interference to the received signal. The transmitter may attempt to either null (e.g., cancel) the destructive interference via precoding or rotate the destructive interference via precoding to change the destructive interference into constructive interference. That is, the transmitter may utilize a precoder to rotate the data transmission relative to the destructive interference by a determined angle so that the interference experienced by the UE when receiving the data transmission is constructive interference. The transmitter/base station may determine, based on transmissions associated with the other UEs, an interference pattern of other UEs to further determine whether the interference to the receiver/UE is constructive interference or destructive interference. The transmitter may adjust the precoder accordingly (e.g., either by nulling destructive interference, rotating destructive interference, or allowing constructive interference to be received without adjusting the precoder).

Figure 6:
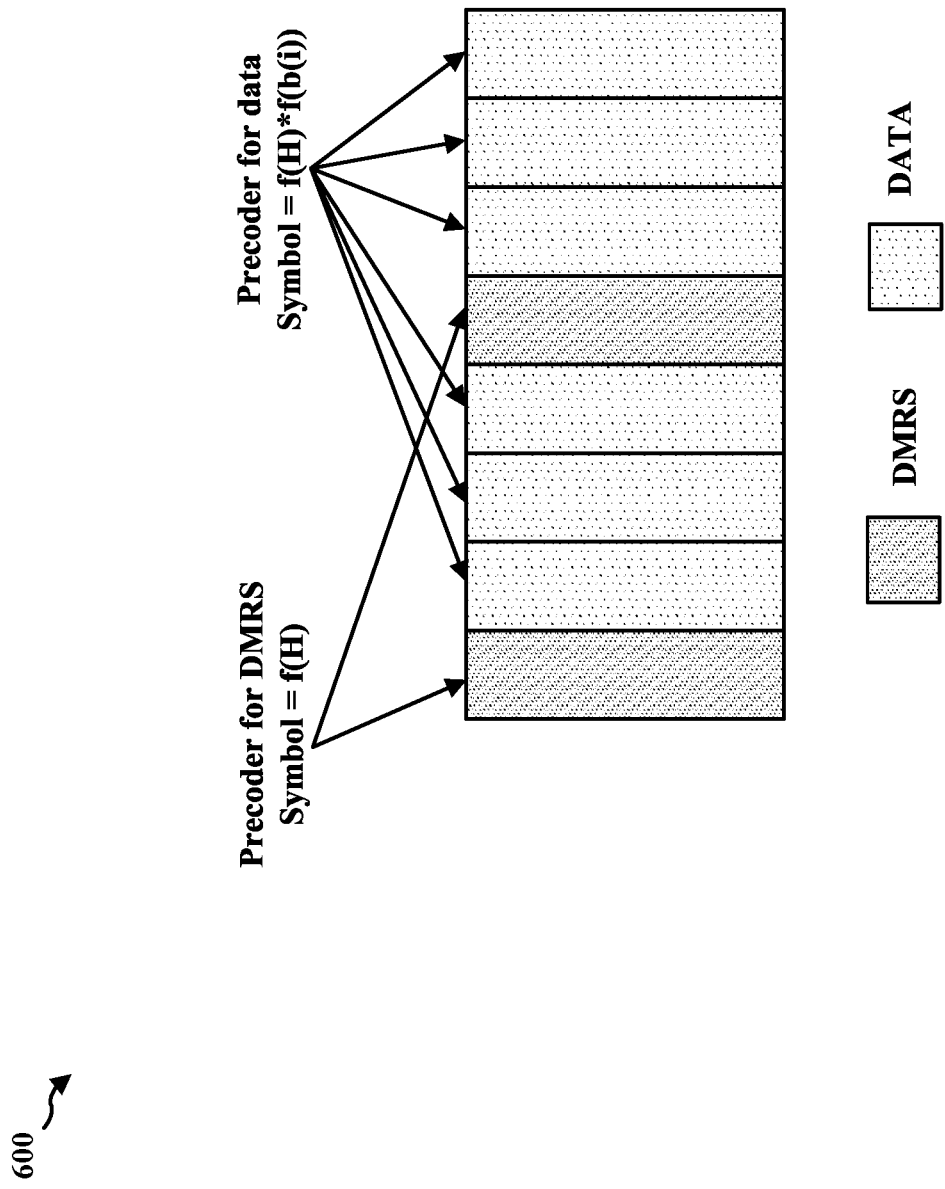
FIG. 6 illustrates a diagram of a slot pattern including demodulation reference signal (DMRS) symbols and data symbols in accordance with various aspects of the present disclosure.

FIG. 6 illustrates a diagram 600 of a slot pattern including DMRS symbols and data symbols. Some precoding and beamforming operations may be based on channel state information (CSI), as described above. For example, the transmitter may execute precoding/beamforming operations based on a quality of the channel between the transmitter and the receiver. For data aware precoding, which may be further based on constructive/destructive interference, the precoding/beamforming operations may be determined by the transmitter based on both CSI and data to be transmitted by the transmitter. A precoder may be determined for each OFDM symbol of the slot diagram 600. For example, the precoder for OFDM symbol i may comprise a function based on f(H)*f(b(i)), as shown by equation 1 below, where f(H) is a function of the channel (H), where f(b(i)) is a function of a beta parameter, and where i corresponds to the data transmitted on the i-th OFDM symbol.

$$\text{Precoder for } i\text{th symbol} = f(H)*f(b(i)) \qquad \text{Equation 1:}$$

If the channel (H) does not change much (or at all) over the OFDM symbols of the diagram 600, f(H) may be associated with a constant precoder that may be applied in a same manner to multiple symbols, e.g., to each OFDM symbol of the slot. In addition to the first (e.g., constant) precoder, a second precoder associated with f(b(i)), which may vary from symbol-to-symbol, may be applied differently to each OFDM symbol of the slot. That is, the input b(i) to the function of the beta parameter f(b(i)) may vary more rapidly, such as on a per OFDM symbol basis, than the input to the function of the channel f(H). In some aspects, the precoder for OFDM symbol i may be based on $H^* \cdot (H \cdot H^*)^{-1} * Rb(i)$, where f(H) may correspond to a zero forcing precoder convoluted with second-order statistics for the input data at OFDM symbol i (e.g., associated with a correlation matrix (Rb(i)).

Accordingly, the transmitter may determine the function of the beta parameter f(b(i)) and combine the function based on the data within an ith symbol f(b(i)) with the function of the channel f(H). By treating the interference as either inter-UE interference between different DL MIMO UEs or intra-UE interference between different MIMO layers, two procedures may be performed to determine f(b(i)). For example, if there are four MIMO layers for the UE, the transmitter may transmit four layers of data to the UE, where interference for each layer of data may be determined based on interference received from the other layers of data. Thus, the interference may be caused by two sources, which may be different UEs or different layers of a same UE. To determine the function of the beta parameter based on the input data (b(i)) on the i-th OFDM symbol, the transmitter may null the destructive interference for the UE/receiver or rotate/turn the destructive interference into constructive interference (e.g., by applying a rotation matrix to the destructive interference).

In cases where the precoder is based on f(H)*f(b(i)), H may correspond to a block fading channel for which the channel may be regarded as constant over a block of OFDM symbols. However, the channel may be regarded as varying from block-to-block. For example, if a block of OFDM symbols corresponds to 5 OFDM symbols, the channel may be regarded as different from a first block of 5 symbols to a second block of 5 OFDM symbols, but may be regarded as constant within a given block of the 5 OFDM symbols. Since f(b(i)) may change more rapidly than f(H), the function of the beta parameter may correspond to a different value for each OFDM symbol.

A data aware precoder may be implemented, based on the channel conditions, by combining a precoder with a per OFDM symbol variation term. The per OFDM variation term may depend on instantaneous data transmitted on OFDM symbol i. To provide per OFDM symbol variation, a data correlation over a plurality of MIMO layers and/or over a plurality of DL UE transmissions may be determined on each subcarrier of the OFDM symbol. In aspects, a correlation matrix may be averaged over the subcarriers to determine the data correlation of OFDM symbol i (e.g., associated with the convolution matrix Rb(i)). A nulling matrix or a rotation matrix may be determined based on the Rb(i) for the per OFDM symbol variation term. Thus, the function f may be a function of Rb(i).

Precoding techniques may include transparent precoding and non-transparent precoding. Transparent precoding may refer to the application of a same precoding matrix to a DMRS symbol and a data symbol. DMRS symbols and data symbols may be transmitted to the UE on a same subframe or slot, such that the UE may estimate the channel based on the DMRS and use the estimated channel to perform demodulation of the data. The channel estimated by the UE may be the physical channel between a transmitting antenna of the base station and a receiving antenna of the UE. However, if the transmitter applies the same precoding on the DMRS symbol and the data symbol, the channel estimated by the UE may correspond to the physical channel multiplied by the precoding. Hence, the precoding may be combined with the channel estimation. As the precoding may be the same on the DMRS symbol and the data symbol, a same estimated channel may be applied on the data symbol and used for demodulation and decoding.

Non-transparent precoding may refer to the use of different precoders on the DMRS symbol and data symbol. When the receiver/UE estimates the channel on the DMRS symbol, the estimated channel may correspond to the physical channel multiplied by the precoder utilized for the DMRS. For example, a first precoder $p_1$ may be applied on DMRS symbol and a second precoder $p_2$ may be applied on the data symbol. The channel estimated based on the DMRS symbol may correspond to the physical channel (e.g., H) times the first precoder $p_1$. On the DMRS symbol, the receiver may determine the channel to be $p_1 \times H$, but on the data symbol the receiver may determine the channel to be $p_2 \times H$. Thus, the channel estimation for the DMRS symbol may not be applied to the data symbol. The receiver may separately determine $p_1$ and $p_2$, such that demodulation may be performed based on a difference between the first channel and the second channel.

Data aware precoding may correspond to non-transparent precoding, as the precoders applied on the DMRS symbol and the data symbol may be different. As data is not transmitted on the DMRS symbol, the DMRS symbol may be precoded based on the function of the channel f(H) (e.g., without the function of f(b(i))). In contrast, the precoder transmitted on the data symbol may correspond to f(H)*f(b(i)), which may indicate to the receiver that the two precoders applied by the transmitter are different. Thus, the DMRS symbol may be precoded based on f(H) only, whereas the data symbol may be precoded based on f(H)*f(b(i)).

When f(H) is common to the DMRS symbol and the data symbol, the transmitter may not need to indicate f(H) to the receiver, and may instead indicate only the f(b(i)) portion of the precoder. Such partial precoding/signaling from the transmitter to the receiver may provide an improved precoding technique. Accordingly, the receiver may estimate the precoded channel on the DMRS symbol, where the precoded channel determined on the data symbol is different from the precoded channel determined on the DMRS symbol by a delta term of f(b(i)). The transmitter may indicate f(b(i)) for each i via signaling to the receiver.

Figures 7A, 7B:
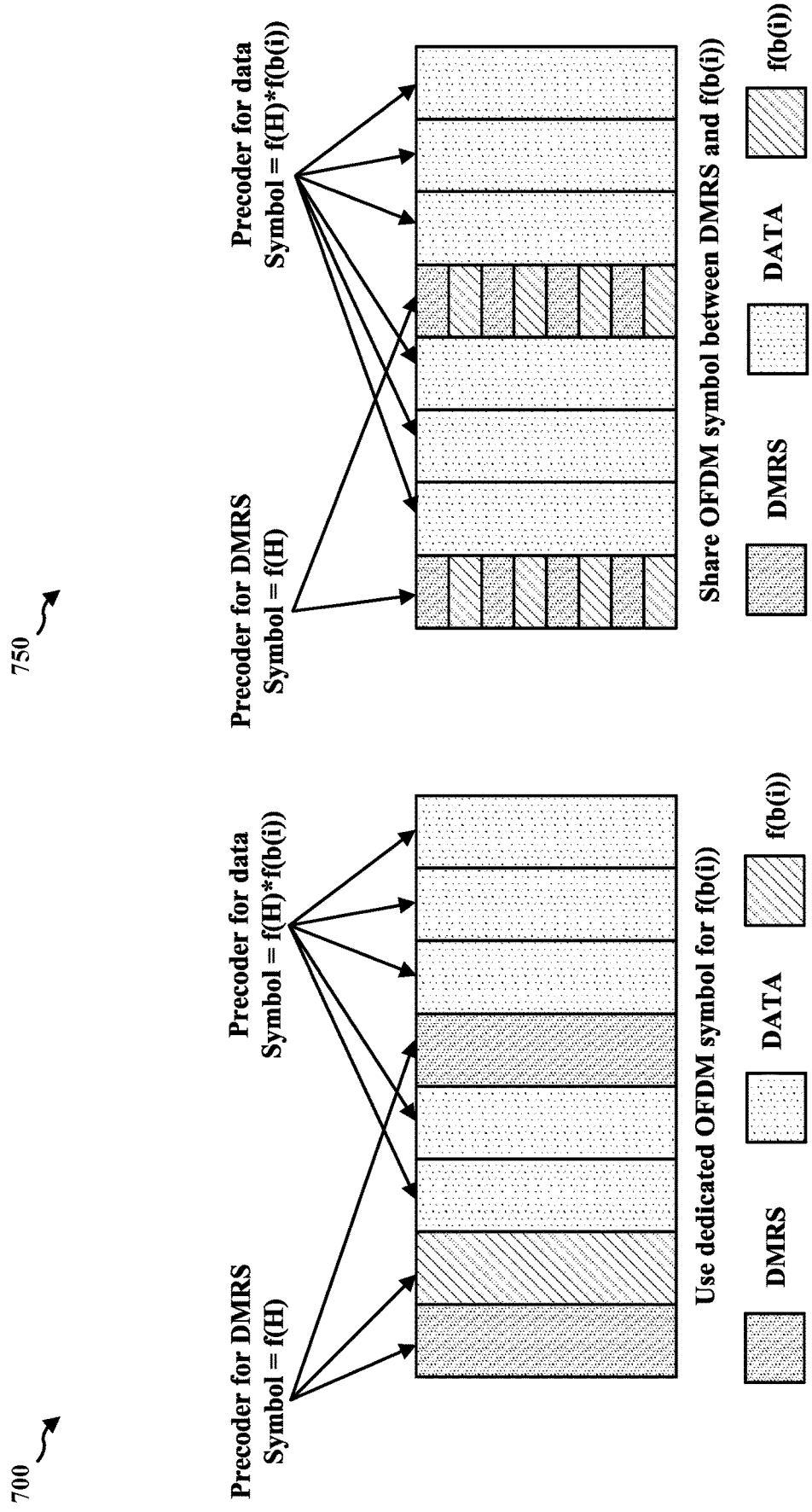
FIGS. 7A-7B illustrate diagrams of slot patterns including a plurality of symbols used to perform channel estimation in accordance with various aspects of the present disclosure.

FIGS. 7A-7B illustrate diagrams 700-750 of slot patterns including DMRS for the UE perform channel estimation and the transmission of f(b(i)) information to the UE. Referring to the diagram 700, the base station may utilize an OFDM symbol to transmit f(b(i)) information to the UE that is separate than the symbol in which the base station transmits the DMRS. To determine the precoding based on f(H)*f(b(i)), the UE may perform a channel estimation based on the DMRS symbol and may decode the f(b(i)) information received in an f(b(i)) symbol. However, the f(b(i)) symbol that includes the f(b(i)) information may not be precoded based on f(b(i)), as the f(b(i)) information may be undeterminable by the UE until after the UE decodes the f(b(i)) information received on the f(b(i)) symbol. Thus, the UE may utilize the same precoding on the f(b(i)) symbol as used for the DMRS, which may be based on f(H). In other words, the precoding performed on the DMRS symbol may be based on the channel f(H), and the precoding performed on the data symbol may be based on a special/dedicated OFDM data symbol (e.g., the f(b(i)) symbol) that includes the f(b(i)) information.

The receiver may initially perform channel estimation on the DMRS symbol. The estimation may be based on the real/physical channel multiplied by the precoder f(H). The estimated channel may be applied to the special OFDM symbol and, because the precoder applied on the DMRS symbol and the special OFDM symbol may be the same precoder, the channel determined by the receiver on the special OFDM symbol may the same channel as determined on the DMRS symbol. Thus, the estimated channel on the DMRS symbol may be applied on the special OFDM symbol to perform decoding. The special OFDM symbol may be utilized to provide the f(b(i)) information to the receiver.

After decoding is performed on the additional OFDM symbol, the receiver may determine the information included on the additional OFDM symbol (e.g., the content of f(b(i))). The receiver may use the estimated channel to decode f(b(i)) for each value of i. After the f(b(i)) information is determined by the receiver, the receiver may apply the information to the other data symbols of the slot (e.g., the data symbols that may include a payload from the transmitter). Thus, f(b(i)) may be applied to OFDM symbol i to determine the effective channel, which may be equal to the estimated channel multiplied by f(b(i)), where the receiver may use the effective channel to demodulate and decode data on OFDM symbol i.

Referring to the diagram 750, signaling procedures to the receiver/UE may be similar to the signal procedures performed based on the diagram 700, except that the DMRS may be multiplexed in a symbol with the f(b(i) information. For example, FIG. 7B illustrates an example in which the DMRS is frequency division multiplexed (FDM-ed) in the diagram 750 with the special OFDM symbol that includes the f(b(i)) information. That is, an OFDM symbol may be shared between the DMRS and the f(b(i)) information. By FDM-ing the DMRS and the f(b(i)), one extra data symbol may be freed up for transmitting a payload to the receiver, as an independent symbol is not used for signaling the f(b(i)) information to the receiver. The receiver may estimate the channel based on the DMRS, and the estimated channel may be applied to REs associated with the f(b(i)) information to decode the f(b(i)) information after such information is determined by the receiver. The f(b(i)) may be applied in addition to the channel estimated based on the DMRS to provide a combined channel for the data symbol that may be used to demodulate and decode the data.

Figure 8:
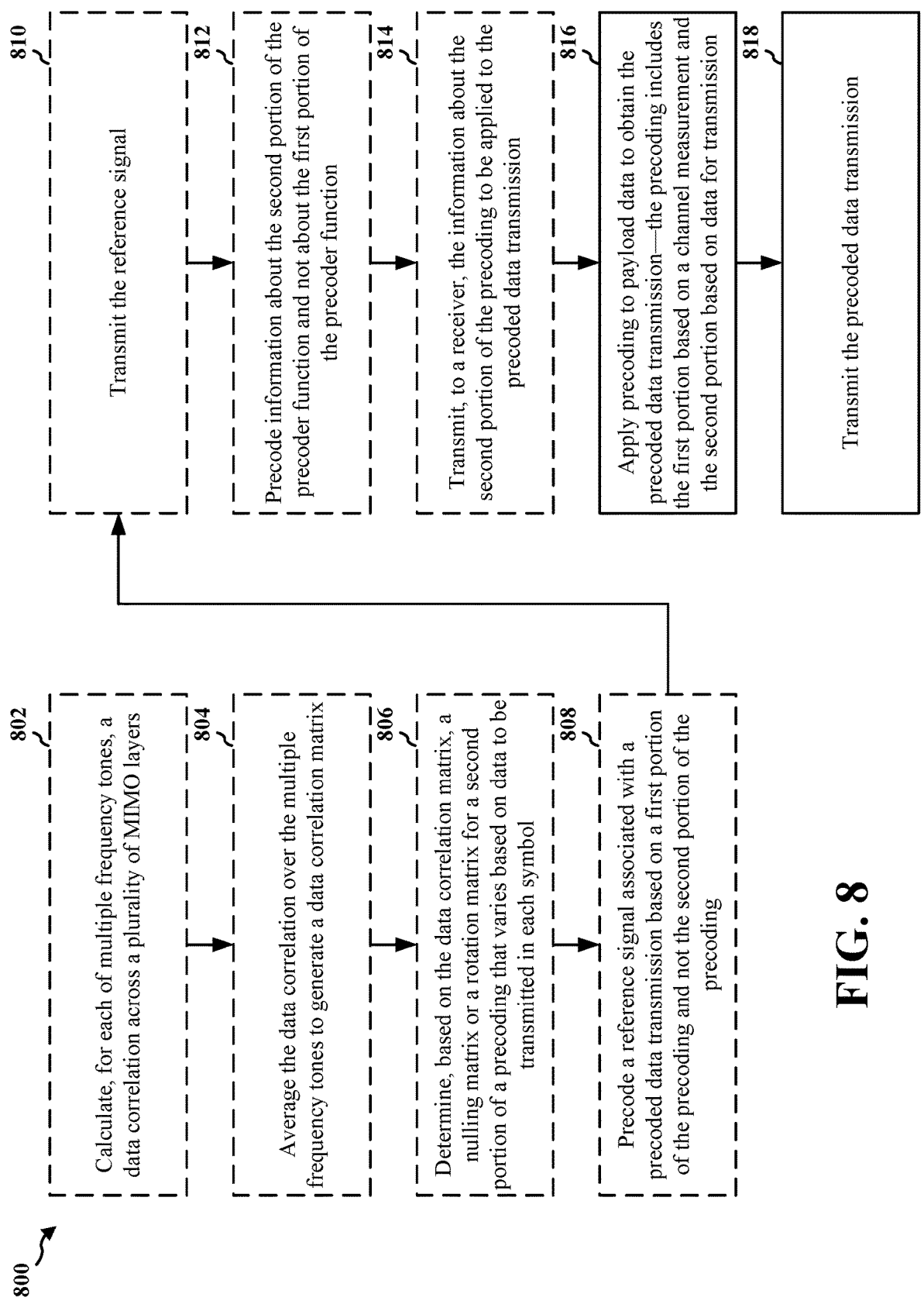
FIG. 8 is a flowchart of a method of wireless communication at a base station in accordance with various aspects of the present disclosure.

FIG. 8 is a flowchart 800 for a method of wireless communication at a wireless device. The method may be performed by a transmitter (e.g., such as those discussed above at FIGS. 1, 3, and 4). In some aspects, the transmitter may be a base station (e.g., the base station 102/404, the apparatus 1202, etc.), which may include the memory 376 and which may be the entire base station 102/404 or a component of the base station 102/404, such as the TX processor 316, the RX processor 370, and/or the controller/processor 375. Optional aspects are illustrated with a dashed line. The method improves precoding techniques and may improve reception of the transmitted signal.

At 802, the wireless device may calculate, for each of multiple frequency tones, a data correlation across a plurality of MIMO layers. For example, referring to FIG. 4, the base station 404 may calculate, at 408b(2a), a data correlation across MIMO layers. The calculation may be performed, e.g., by the calculation component 1244 of the apparatus 1202.

At 804, the wireless device may average the data correlation over the multiple frequency tones to generate a data correlation matrix. For example, referring to FIG. 4, the base station 404 may average, at 408b(2b), the data correlation. The averaging may be performed, e.g., by the averaging component 1246 of the apparatus 1202.

At 806, the wireless device may determine, based on the data correlation matrix, a nulling matrix or a rotation matrix for a second portion of a precoding that varies based on data to be transmitted in each symbol. For example, referring to FIG. 4, the base station 404 may determine, at 408b(2c), a nulling matrix or a rotation matrix. The determination may be performed, e.g., by the determination component 1242 of the apparatus 1202.

At 808, the wireless device may precode a reference signal associated with a precoded data transmission based on a first portion of the precoding and not the second portion of the precoding. For example, referring to FIG. 4, the base station 404 may precode, at 410, a reference signal based on the first portion of the precoder function. That is, the base station 404 may precode the first portion of the reference signal based on f(H). The precoding may be performed, e.g., by the precoder component 1248 of the apparatus 1202.

At 810, the wireless device may transmit the reference signal. For example, referring to FIG. 4, the base station 404 may transmit, at 412, a precoded reference signal to the UE 402. In aspects, the reference signal may comprise DMRS. The transmission may be performed, e.g., by the transmission component 1234 of the apparatus 1202.

At 812, the wireless device may precode information about the second portion of the precoder function and not about the first portion of the precoder function. For example, referring to FIG. 4, the base station 404 may precode, at 416, information about the second portion of the precoder functions after the first portion of the precoder function. The precoding may be performed, e.g., by the precoder component 1248 of the apparatus 1202.

At 814, the wireless device may transmit, to a receiver, the information about the second portion of the precoding to be applied to the precoded data transmission. For example, referring to FIG. 4, the base station 404 may transmit, at 418, precoded information about the second portion of the precoder function to the UE 402. The second portion comprises a per symbol function (e.g., f(b(i))) based on the data for each of a plurality of symbols of the precoded data transmission. In aspects, the reference signal may be transmitted in a first symbol, the information about the second portion of the precoding (e.g., f(b(i))) may be transmitted in a second symbol, and the precoded data transmission may be transmitted in one or more additional symbols. A wireless device may multiplex the information about the second portion of the precoding (e.g., f(b(i))) in a same symbol as the reference signal (e.g., DMRS). The transmission may be performed, e.g., by the transmission component 1234 of the apparatus 1202.

At 816, the wireless device may apply precoding to payload data to obtain the precoded data transmission—the precoding includes the first portion based on a channel measurement and the second portion based on data for transmission. For example, referring to FIG. 4, the base station 404 may apply, at 420, the first portion and the second portion of the precoder function to payload data, where the first portion may be based on f(H) and the second portion may be based on f(b(i)). In aspects, the wireless device may apply the precoding per symbol based on the data to be transmitted in a corresponding symbol. The second portion of the precoding (e.g., f(b(i))) further based on whether the interference will be constructive or destructive for the data. The second portion of the precoding (e.g., f(b(i))) may at least partially nulls destructive interference for the precoded data transmission. Alternatively, the second portion of the precoding (e.g., f(b(i))) may adjust a data transmission to change destructive interference into constructive interference for the precoded data transmission. In further aspects, the second portion of the precoding (e.g., f(b(i))) may rotate a data transmission relative to destructive interference. The first portion of the precoding (e.g., f(H)) may vary based on the channel measurement over multiple symbols and the second portion (e.g., f(b(i))) of the precoding may vary based on the data to be transmitted in each symbol. The precoding may be performed, e.g., by the application component 1250 of the apparatus 1202.

At 818, the wireless device may transmit the precoded data transmission. For example, referring to FIG. 4, the base station 404 may transmit, at 422, the precoded data transmission. The transmission may be performed, e.g., by the transmission component 1234 of the apparatus 1202.

Figure 9:
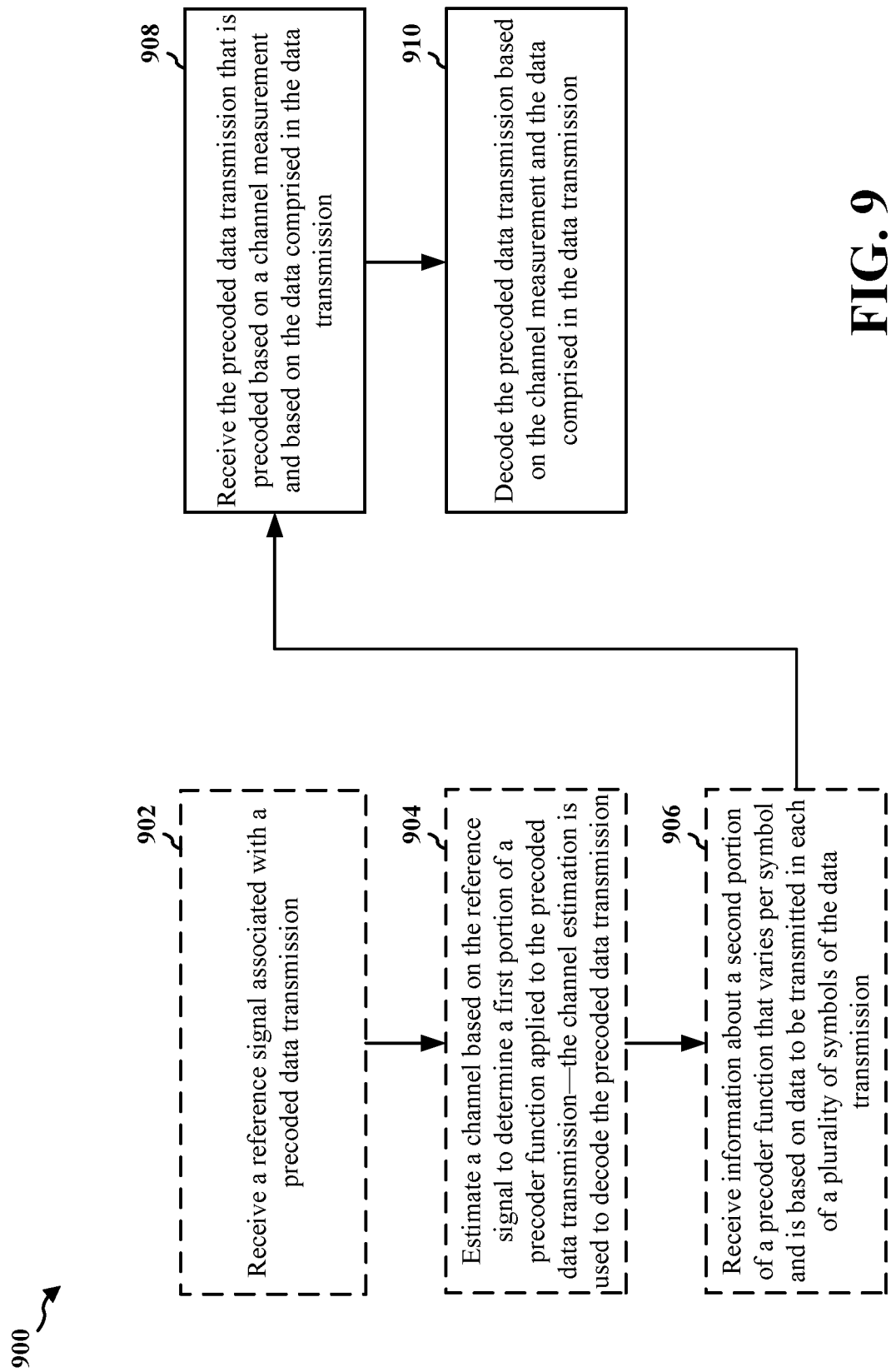
FIG. 9 is a flowchart of a method of wireless communication at a UE in accordance with various aspects of the present disclosure.

FIG. 9 is a flowchart 900 of a method of wireless communication at a wireless device. The method may be performed by a receiver. In some aspects, the receiver may be a UE (e.g., the UE 104/402, the apparatus 1302, etc.), which may include the memory 360 and which may be the entire UE 104/402 or a component of the UE 104/402, such as the TX processor 368, the RX processor 356, and/or the controller/processor 359. Optional aspects are illustrated with a dashed line. The method improves precoding techniques and may improve reception of data.

At 902, the wireless device may receive a reference signal associated with a precoded data transmission. For example, referring to FIG. 4, the UE 402 may receive, at 412, a precoded reference signal from the base station 404. The reference signal may comprise a DMRS. The reception of the information may be performed, e.g., by the reception component 1330 of the apparatus 1302.

At 904, the wireless device may estimate a channel based on the reference signal to determine a first portion of a precoder function applied to the precoded data transmission—the channel estimation is used to decode the precoded data transmission. For example, referring to FIG. 4, the UE 402 may estimate a channel, at 414, to determine a first portion of the precoder function (e.g. based on f(H)). The estimation may be performed, e.g., by the estimation component 1340 of the apparatus 1302.

At 906, the wireless device may receive information about a second portion of a precoder function that varies per symbol and is based on data to be transmitted in each of a plurality of symbols of the data transmission. For example, referring to FIG. 4, the UE 402 may receive, at 418, precoded information about the second portion of the precoder function (e.g., based on f(b(i))). The first portion of the precoder function (e.g., f(H)) may vary based on a channel measurement over multiple symbols and the second portion of the precoder function (e.g., f(b(i))) may vary based on data to be transmitted in each symbol. The information about the second portion of the precoder function (e.g., f(b(i))) may be precoded based on the first portion of the precoder function (e.g., f(H)) and not based on the second portion of the precoder function (e.g., f(b(i))). Referring to FIGS. 4 and 7A, the wireless device may receive, at 412, the reference signal (e.g., DMRS) in a first symbol and receive, at 418, the information about the second portion of the precoder function (e.g., f(b(i))) in a second symbol. Referring to FIG. 7B, the wireless device may alternatively receive the information about the second portion of the precoder function (e.g., f(b(i))) in a same symbol as the reference signal (e.g., DMRS). The reception of the information may be performed, e.g., by the precoder information component 1344 via the reception component 1330 of the apparatus 1302.

At 908, the wireless device may receive the precoded data transmission that is precoded based on a channel measurement and based on the data comprised in the data transmission. For example, referring to FIG. 4, the UE 402 may receive, at 422, a precoded data transmission from the base station 404. The reception of the information may be performed, e.g., by the precoder information component 1344 via the reception component 1330 of the apparatus 1302.

At 910, the wireless device may decode the precoded data transmission based on the channel measurement and the data comprised in the data transmission. For example, referring to FIG. 4, the UE 402 may decode, at 424, the precoded data transmission received from the base station 404. The decoding may be performed, e.g., by the decoder component 1342 of the apparatus 1302.

Figure 10A:
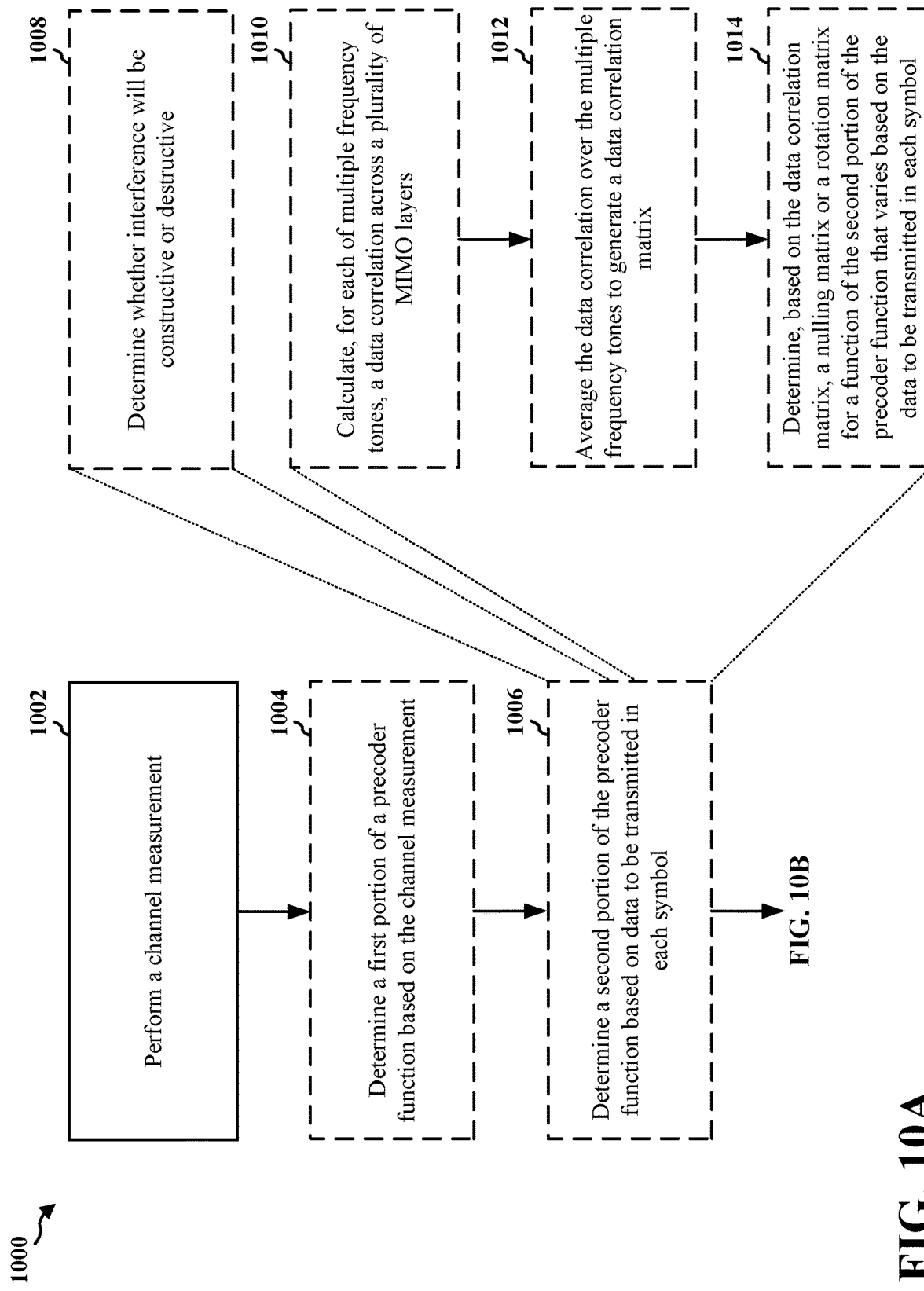
FIGS. 10A-10B is a flowchart of a method of wireless communication at a base station in accordance with various aspects of the present disclosure.
Figures 10A, 10B:
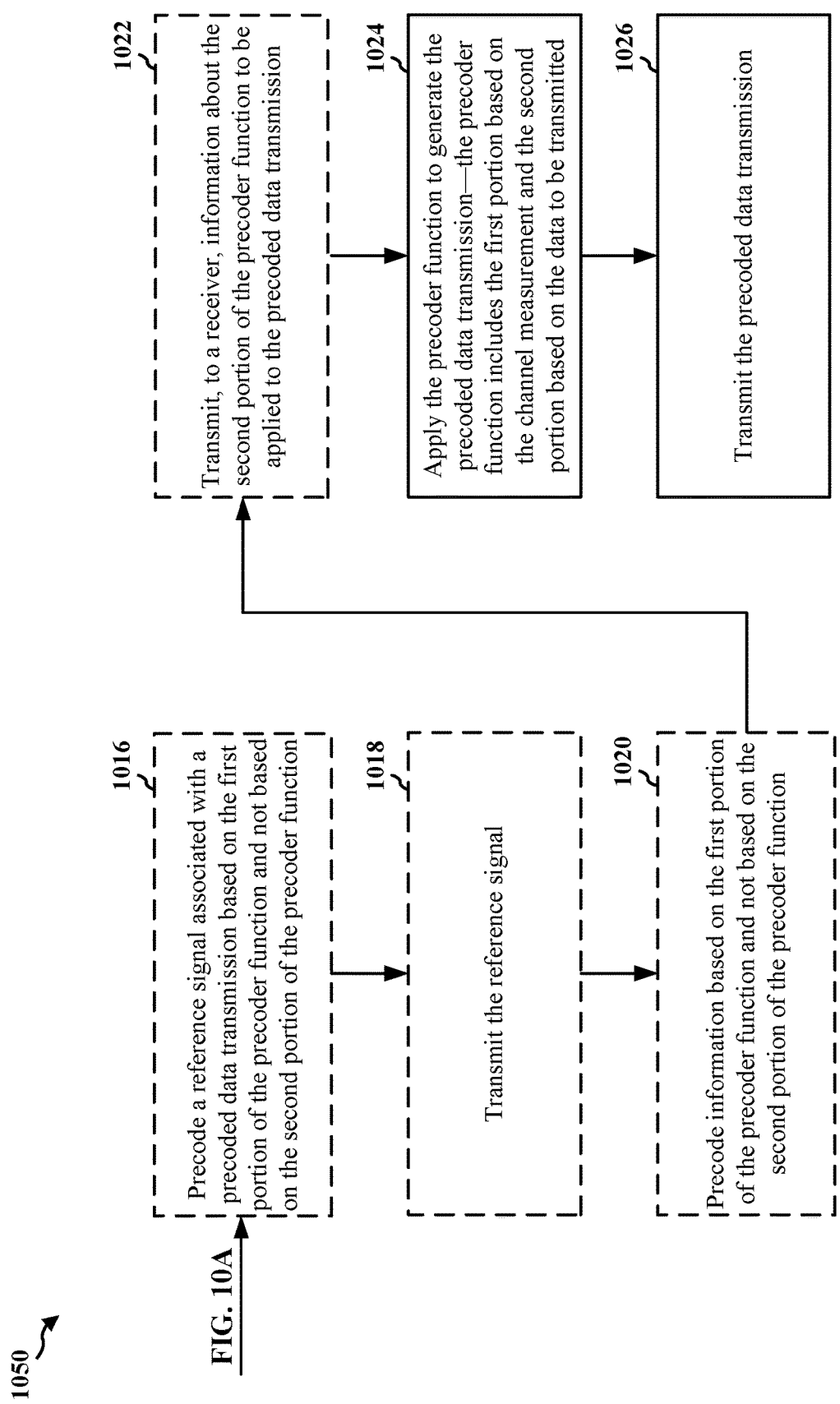

FIGS. 10A-10B depict flowcharts 1000 and 1050 for a method of wireless communication at a wireless device. The method may be performed by a transmitter (e.g., such as those discussed above at FIGS. 1, 3, and 4). In some aspects, the transmitter may be a base station (e.g., the base station 102/404, the apparatus 1202, etc.), which may include the memory 376 and which may be the entire base station 102/404 or a component of the base station 102/404, such as the TX processor 316, the RX processor 370, and/or the controller/processor 375. Optional aspects are illustrated with a dashed line. The method improves precoding techniques and may improve reception of the transmitted signal.

At 1002, the wireless device may perform a channel measurement. For example, referring to FIG. 4, the base station 404 may perform, at 406, the channel measurement. The channel measurement may include CSI. The measurement may be performed, e.g., by the performance component 1240 of the apparatus 1202.

At 1004, the wireless device may determine a first portion of a precoder function. In some deployments, precoder determination is based at least partially on channel measurement. For example, referring to FIGS. 4 and 6-7B, the base station 404 may determine, at 408a, a first portion of the precoder function (e.g., based on CSI). In the diagrams 600-750, the first portion of the precoder function may correspond to f(H). The determination may be performed, e.g., by the determination component 1242 of the apparatus 1202.

At 1006, the wireless device may determine a second portion of the precoder function based on information to be transmitted. This information may include data and/or control signaling. This determination can be based on symbol level for one or more symbols for transmission (e.g., data queued for transmission or data being transmitted). For example, referring to any of FIGS. 4-7B, the base station 404 may determine, at 408a, a second portion of the precoder function. In the diagrams 600-750, the second portion of the precoder function may correspond to f(b(i)). The second portion of the precoder function (e.g., f(b(i))) may rotate a data transmission relative to destructive interference (e.g., relative to the destructive regions illustrated in the diagrams 500-530). The first portion of the precoder function may include a first function (e.g., f(H)) that varies based on the channel measurement over multiple symbols and the second portion of the precoder function may include a second function (e.g., f(b(i))) that varies based on the data to be transmitted in each symbol. The determination may be performed, e.g., by the determination component 1242 of the apparatus 1202.

At 1008, to determine the second portion of the precoder function, the wireless device may determine whether interference will be constructive or destructive. The determination may be performed, e.g., by the determination component 1242 of the apparatus 1202. For example, referring to FIGS. 4-5, the base station 404 may determine, at 408b(1) whether the interference is constructive or destructive. That is, the base station 404 may determine, e.g., whether the interference corresponds to a location in the constructive region or the destructive regions in the diagrams 500-530. In aspects, the second portion of the precoder function (e.g., f(b(i))) may null the destructive interference for a precoded data transmission. In further aspects, the second portion of the precoder function (e.g., f(b(i))) may adjust a data transmission to change destructive interference into constructive interference for the precoded data transmission.

At 1010, to determine the second portion of the precoder function, the wireless device may calculate, for each of multiple frequency tones, a data correlation across a plurality of MIMO layers. For example, referring to FIG. 4, the base station 404 may calculate, at 408b(2a), a data correlation across MIMO layers. The calculation may be performed, e.g., by the calculation component 1244 of the apparatus 1202.

At 1012, to determine the second portion of the precoder function, the wireless device may average the data correlation over the multiple frequency tones to generate a data correlation matrix. For example, referring to FIG. 4, the base station 404 may average, at 408b(2b), the data correlation. The generation of the data correlation matrix may be performed, e.g., by the averaging component 1246 of the apparatus 1202.

At 1014, to determine the second portion of the precoder function, the wireless device may determine, based on the data correlation matrix, a nulling matrix or a rotation matrix for a function of the second portion of the precoder function that varies based on the data to be transmitted in each symbol. For example, referring to FIG. 4, the base station 404 may determine, at 408b(2c), a nulling matrix or a rotation matrix. The determination may be performed, e.g., by the determination component 1242 of the apparatus 1202.

At 1016, the wireless device may precode a reference signal associated with a precoded data transmission based on the first portion of the precoder function and not based on the second portion of the precoder function. For example, referring to FIG. 4, the base station 404 may precode, at 410, a reference signal based on the first portion of the precoder function. That is, the base station 404 may precode the first portion of the reference signal based on f(H). The precoding may be performed, e.g., by the precoder component 1248 of the apparatus 1202.

At 1018, the wireless device may transmit the reference signal. For example, referring to FIG. 4, the base station 404 may transmit, at 412, a precoded reference signal to the UE 402. In aspects, the reference signal may comprise DMRS. The transmission may be performed, e.g., by the transmission component 1234 of the apparatus 1202.

At 1020, the wireless device may precode information based on the first portion of the precoder function and not based on the second portion of the precoder function. The precoding may be performed, e.g., by the precoder component 1248 of the apparatus 1202. For example, referring to FIG. 4, the base station 404 may precode, at 416, information about the second portion of the precoder functions based on the first portion of the precoder function. In aspects, referring to FIGS. 4 and 7A, the wireless device may transmit, at 412, the reference signal in a first symbol (e.g., DMRS), transmit, at 418, the information about the second portion of the precoder function in a second symbol (e.g., f(b(i))), and transmit, at 422, the precoded data transmission in one or more additional symbols (e.g., data). In further aspects, referring to FIG. 7B, the wireless device may multiplex the information about the second portion of the precoder function (e.g., f(b(i))) in a same symbol as the reference signal (e.g., DMRS).

At 1022, the wireless device may transmit, to a receiver, information about the second portion of the precoder function to be applied to the precoded data transmission. For example, referring to FIG. 4, the base station 404 may transmit, at 418, precoded information about the second portion of the precoder function to the UE 402. In aspects, the second portion (e.g., f(b(i))) may include a function based on the data for each symbol of the precoded data transmission. The transmission may be performed, e.g., by the transmission component 1234 of the apparatus 1202.

At 1024, the wireless device may apply the precoder function to generate the precoded data transmission—the precoder function includes the first portion based on the channel measurement and the second portion based on the data to be transmitted. For example, referring to FIG. 4, the base station 404 may apply, at 420, the first portion and the second portion of the precoder function, where the first portion may be based on f(H) and the second portion may be based on f(b(i)). In aspects, the wireless device may apply the precoder function per symbol based on the data to be transmitted in a corresponding symbol. The precoding may be performed, e.g., by the application component 1250 of the apparatus 1202.

At 1026, the wireless device may transmit the precoded data transmission. For example, referring to FIG. 4, the base station 404 may transmit, at 422, the precoded data transmission. The transmission may be performed, e.g., by the transmission component 1234 of the apparatus 1202.

Figure 11:
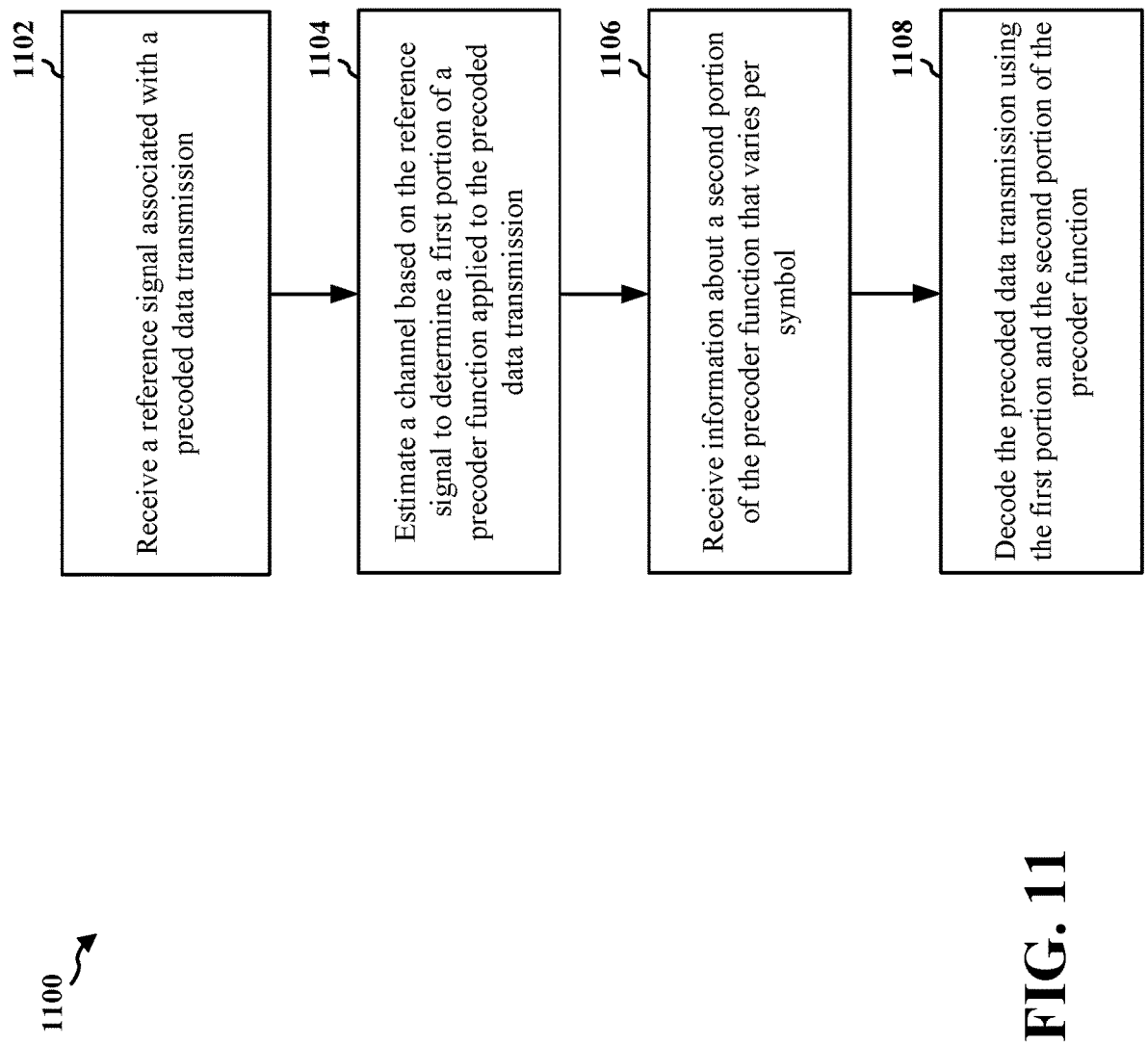
FIG. 11 is a flowchart of a method of wireless communication at a UE in accordance with various aspects of the present disclosure.

FIG. 11 is a flowchart 1100 of a method of wireless communication at a wireless device. The method may be performed by a receiver. In some aspects, the receiver may be a UE (e.g., the UE 104/402, the apparatus 1302, etc.), which may include the memory 360 and which may be the entire UE 104/402 or a component of the UE 104/402, such as the TX processor 368, the RX processor 356, and/or the controller/processor 359. Optional aspects are illustrated with a dashed line. The method improves precoding techniques and may improve reception of data.

At 1102, the wireless device may receive a reference signal associated with a precoded data transmission. For example, referring to FIG. 4, the UE 402 may receive, at 412, a precoded reference signal from the base station 404. In aspects, the precoded reference signal may include DMRS. The reception of the information may be performed, e.g., by the reception component 1330 of the apparatus 1302.

At 1104, the wireless device may estimate a channel based on the reference signal to determine a first portion of a precoder function applied to the precoded data transmission. For example, referring to FIG. 4, the UE 402 may estimate a channel, at 414, to determine a first portion of the precoder function (e.g. based on f(H)). The estimation may be performed, e.g., by the estimation component 1340 of the apparatus 1302.

At 1106, the wireless device may receive information about a second portion of the precoder function that varies per symbol. The reception of the information may be performed, e.g., by the precoder information component 1344 via the reception component 1330 of the apparatus 1302 in FIG. 13. For example, referring to FIG. 4, the UE 402 may receive, at 418, precoded information about the second portion of the precoder function (e.g., based on f(b(i))). The first portion of the precoder function (e.g., f(H)) may vary based on a channel measurement over multiple symbols and the second portion of the precoder function (e.g., f(b(i))) may vary based on data to be transmitted in each symbol. The information about the second portion of the precoder function (e.g., f(b(i))) may be precoded based on the first portion of the precoder function (e.g., f(H)) and not based on the second portion of the precoder function (e.g., f(b(i))). Referring to FIGS. 4 and 7A, the wireless device may receive, at 412, the reference signal (e.g., DMRS) in a first symbol and receive, at 418, the information about the second portion of the precoder function (e.g., f(b(i))) in a second symbol. Referring to FIG. 7B, the wireless device may receive the information about the second portion of the precoder function (e.g., f(b(i))) in a same symbol as the reference signal (e.g., DMRS).

At 1108, the wireless device may decode the precoded data transmission using the first portion and the second portion of the precoder function. For example, referring to FIG. 4, the UE 402 may decode, at 424, the precoded data transmission received from the base station 404. The decoding may be performed, e.g., by the decoder component 1342 of the apparatus 1302.

Figure 12:
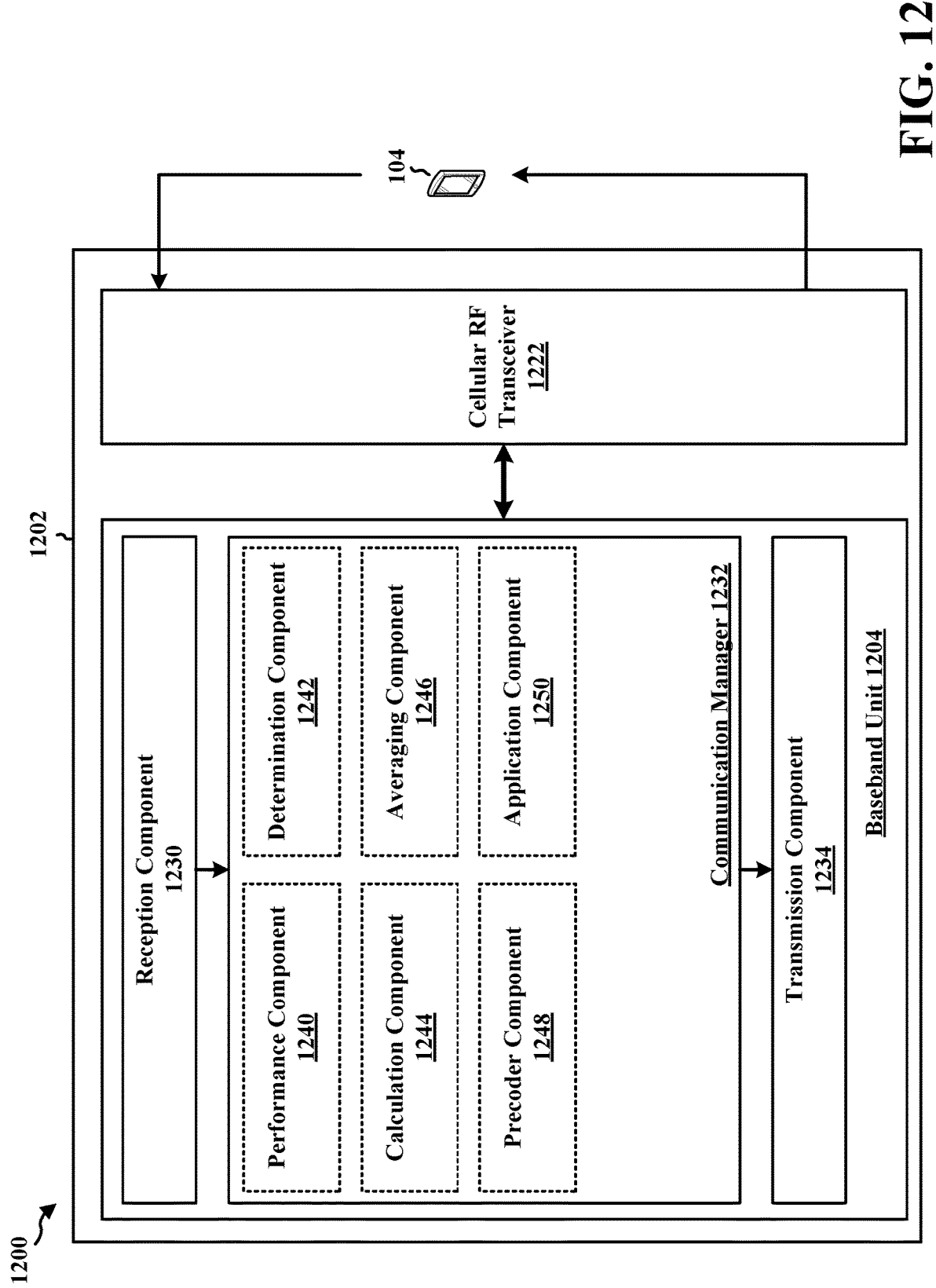
FIG. 12 is a diagram illustrating an example of a hardware implementation for an example apparatus in accordance with various aspects of the present disclosure.

FIG. 12 is a diagram 1200 illustrating an example of a hardware implementation for an apparatus 1202. The apparatus 1202 may be a base station (or implement base station functionality). The apparatus 1202 can include a baseband unit 1204. In some scenarios, the apparatus 1202 may be a UE (or implement UE functionality).

The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described herein (e.g., the various functions described in the flowcharts of FIGS. 8 and 10A-10B). The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

In a first example, the communication manager 1232 includes a calculation component 1244 that is configured, e.g., as described in connection with 802, to calculate, for each of multiple frequency tones, a data correlation across a plurality of MIMO layers. The communication manager 1232 further includes an averaging component 1246 that is configured, e.g., as described in connection with 804, to average the data correlation over the multiple frequency tones to generate a data correlation matrix. The communication manager 1232 further includes a determination component 1242 that is configured, e.g., as described in connection with 806, to determine, based on the data correlation matrix, a nulling matrix or a rotation matrix for a second portion of a precoding that varies based on data to be transmitted in each symbol. The communication manager 1232 further includes a precoder component 1248 that is configured, e.g., as described in connection with 808, to precode a reference signal associated with a precoded data transmission based on a first portion of the precoding and not the second portion of the precoding. As described in connection with 812, the precoder component 1248 is further configured to precode information about the second portion of the precoder function and not about the first portion of the precoder function. The communication manager 1232 further includes an application component 1250 that is configured, e.g., as described in connection with 816, to apply precoding to payload data to obtain the precoded data transmission—the precoding includes the first portion based on a channel measurement and the second portion based on data for transmission.

The transmission component 1234 is configured, e.g., as described in connection with 810, to transmit the reference signal. As described in connection with 814, the transmission component 1234 if further configured to transmit, to a receiver, the information about the second portion of the precoding to be applied to the precoded data transmission. As described in connection with 818, the transmission component 1234 if further configured to transmit the precoded data transmission.

In a second example, the communication manager 1232 includes a performance component 1240 that is configured, e.g., as described in connection with 1002, to perform a channel measurement. The communication manager 1232 further includes a determination component 1242 that is configured, e.g., as described in connection with 1004, to determine a first portion of a precoder function based on the channel measurement. As described in connection with 1006, the determination component 1242 is further configured to determine a second portion of the precoder function based on data to be transmitted in each symbol. As described in connection with 1008, the determination component 1242 is further configured to determine whether interference will be constructive or destructive. As described in connection with 1014, the determination component 1242 is further configured to determine, based on the data correlation matrix, a nulling matrix or a rotation matrix for a function of the second portion of the precoder function that varies based on the data to be transmitted in each symbol. The communication manager 1232 further includes a calculation component 1244 that is configured, e.g., as described in connection with 1010, to calculate, for each of multiple frequency tones, a data correlation across a plurality of MIMO layers. The communication manager 1232 further includes an averaging component 1246 that is configured, e.g., as described in connection with 1012, to average the data correlation over the multiple frequency tones to generate a data correlation matrix. The communication manager 1232 further includes a precoder component 1248 that is configured, e.g., as described in connection with 1016, to precode a reference signal associated with a precoded data transmission based on the first portion of the precoder function and not based on the second portion of the precoder function. As described in connection with 1020, the precoder component 1048 is further configured to precode information based on the first portion of the precoder function and not based on the second portion of the precoder function. The communication manager 1232 further includes an application component 1250 that is configured, e.g., as described in connection with 1024, to apply the precoder function to generate the precoded data transmission, where the precoder function includes the first portion based on the channel measurement and the second portion based on the data to be transmitted. T The transmission component 1234 is configured, e.g., as described in connection with 1018, to transmit the reference signal. As described in connection with 1022, the transmission component 1234 if further configured to transmit, to a receiver, information about the second portion of the precoder function to be applied to the precoded data transmission. As described in connection with 1026, the transmission component 1234 if further configured to transmit the precoded data transmission.

The apparatus may include additional components that perform each of the blocks of the algorithm in the flowcharts of FIGS. 8 and 10A-10B. As such, each block in the flowcharts of FIGS. 8 and 10A-10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for performing a channel measurement, means for applying a precoder function to generate a precoded data transmission, where the precoder function includes a first portion based on the channel measurement and a second portion based on data to be transmitted, and means for transmitting the precoded data transmission. The apparatus 1202 further includes means for determining the first portion of the precoder function based on the channel measurement, and means for determining the second portion of the precoder function based on the data to be transmitted in each symbol. The apparatus 1202 further includes means for determining whether interference will be constructive or destructive for the data, where the second portion of the precoder function is further based on whether the interference will be constructive or destructive for the data. The apparatus 1202 further includes means for calculating, for each of multiple frequency tones, a data correlation across a plurality of MIMO layers, means for averaging the data correlation over the multiple frequency tones to generate a data correlation matrix, and means for determining, based on the data correlation matrix, a nulling matrix or a rotation matrix for the second function that varies based on the data to be transmitted in each symbol. The apparatus 1202 further includes means for precoding a reference signal associated with the precoded data transmission based on the first portion of the precoder function and not the second portion of the precoder function, and means for transmitting the reference signal. The apparatus 1202 further includes means for transmitting, to a receiver, information about the second portion of the precoder function to be applied to the precoded data transmission. The apparatus 1202 further includes means for precoding the information based on the first portion of the precoder function and not based on the second portion of the precoder function.

The means for performing the various functions may be one or more of the components included in the apparatus 1202. As described in regard to FIG. 3, the apparatus 1202 may include the TX Processor 316, the RX Processor 370, and the controller/processor 375. As such, in one configuration, the means for performing the various functions may be the TX Processor 316, the RX Processor 370, and the controller/processor 375.

Figure 13:
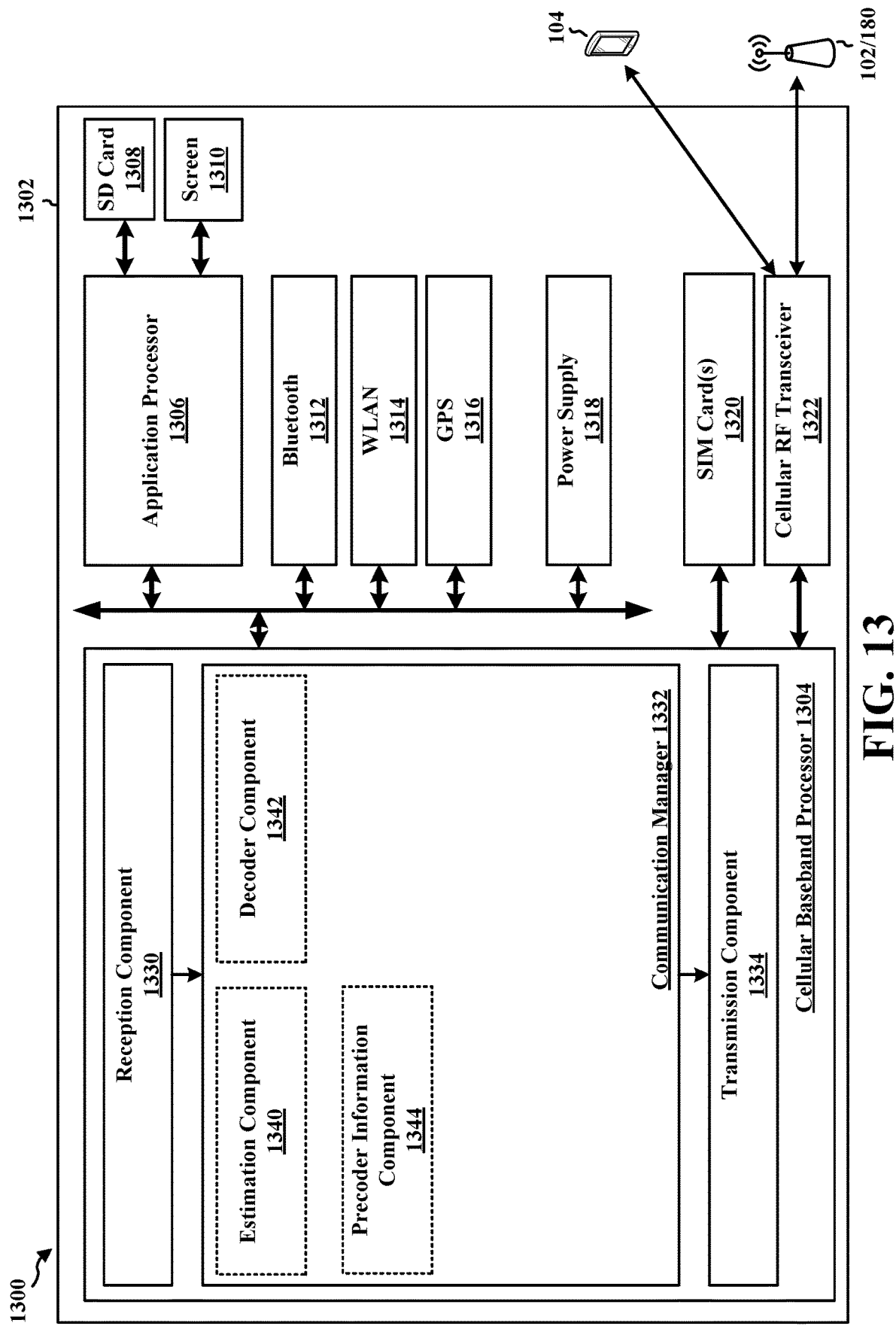
FIG. 13 is a diagram illustrating an example of a hardware implementation for an example apparatus in accordance with various aspects of the present disclosure.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described herein (e.g., the various functions described in the flowchart of FIGS. 9 and 11). The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

In a first example, the reception component 1330 is configured, e.g., as described in connection with 902, to receive a reference signal associated with a precoded data transmission. As described in connection with 906, the reception component 1330 is further configured to receive information about a second portion of a precoder function that varies per symbol and is based on data to be transmitted in each of a plurality of symbols of the data transmission. As described in connection with 909, the reception component 1330 is further configured to receive the precoded data transmission that is precoded based on a channel measurement and based on the data comprised in the data transmission.

The communication manager 1332 includes an estimation component 1340 that is configured, e.g., as described in connection with 904, to estimate a channel based on the reference signal to determine a first portion of a precoder function applied to the precoded data transmission, where the channel estimation is used to decode the precoded data transmission. The communication manager 1332 includes a decoder component 1342 that is configured, e.g., as described in connection with 910, to decode the precoded data transmission based on the channel measurement and the data comprised in the data transmission.

In a second example, the reception component 1330 is configured, e.g., as described in connection with 1102 and 1106, to receive a reference signal associated with a precoded data transmission. As described in connection with 1106, the reception component 1330 is further configured to receive information about a second portion of the precoder function that varies per symbol.

The communication manager 1332 includes an estimation component 1340 that is configured, e.g., as described in connection with 1104, to estimate a channel based on the reference signal to determine a first portion of a precoder function applied to the precoded data transmission. The communication manager 1332 further includes a decoder component 1342 that is configured, e.g., as described in connection with 1108, to decode the precoded data transmission using the first portion and the second portion of the precoder function.

The apparatus may include additional components that perform each of the blocks of the algorithm in the flowchart of FIGS. 9 and 11. As such, each block in the flowchart of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving a reference signal associated with a precoded data transmission, means for estimating a channel based on the reference signal to determine a first portion of a precoder function applied to the precoded data transmission, means for receiving information about a second portion of the precoder function that varies per symbol, and means for decoding the precoded data transmission using the first portion and the second portion of the precoder function.

The means for performing the various functions may be one or more of the components included in the apparatus 1302. As described in regard to FIG. 3, the apparatus 1302 may include the TX Processor 368, the RX Processor 356, and the controller/processor 359. As such, in one configuration, the means for performing the various functions may be the TX Processor 368, the RX Processor 356, and the controller/processor 359.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a wireless device, comprising: applying precoding to payload data to obtain a precoded data transmission, the precoding including a first portion based on a channel measurement and a second portion based on data for transmission; and transmitting the precoded data transmission.

Aspect 2 may be combined with aspect 1 and further includes applying the precoding per symbol based on the data to be transmitted in a corresponding symbol.

Aspect 3 may be combined with any of aspects 1-2 and further includes applying the second portion of the precoding further based on whether the interference will be constructive or destructive for the data.

Aspect 4 may be combined with any of aspects 1-3 and includes that the second portion of the precoding at least partially nulls destructive interference for the precoded data transmission.

Aspect 5 may be combined with any of aspects 1-3 and includes that the second portion of the precoding adjusts a data transmission to change destructive interference into constructive interference for the precoded data transmission.

Aspect 6 may be combined with any of aspects 1-5 and includes that the second portion of the precoding rotates a data transmission relative to destructive interference.

Aspect 7 may be combined with any of aspects 1-6 and includes that the first portion of the precoding varies based on the channel measurement over multiple symbols and the second portion of the precoding varies based on the data to be transmitted in each symbol.

Aspect 8 may be combined with any of aspects 1-7 and further includes calculating, for each of multiple frequency tones, a data correlation across a plurality of MIMO layers; averaging the data correlation over the multiple frequency tones to generate a data correlation matrix; and determining, based on the data correlation matrix, a nulling matrix or a rotation matrix for the second portion of the precoding that varies based on the data to be transmitted in each symbol.

Aspect 9 may be combined with any of aspects 1-8 and further includes precoding a reference signal associated with the precoded data transmission based on the first portion of the precoding and not the second portion of the precoding; and transmitting the reference signal.

Aspect 10 may be combined with any of aspects 1-9 and includes that the reference signal comprises a DMRS.

Aspect 11 may be combined with any of aspects 1-10 and further includes transmitting, to a receiver, information about the second portion of the precoding to be applied to the precoded data transmission.

Aspect 12 may be combined with any of aspects 1-11 and includes that the second portion comprises a per symbol function based on the data for each of a plurality of symbols of the precoded data transmission.

Aspect 13 may be combined with any of aspects 1-12 and further includes precoding the information based on the first portion and not based on the second portion of a precoder function.

Aspect 14 may be combined with any of aspects 1-13 and further includes transmitting the reference signal in a first symbol, transmitting the information about the second portion of the precoding in a second symbol, and transmitting the precoded data transmission in one or more additional symbols.

Aspect 15 may be combined with any of aspects 1-13 and includes that the wireless device multiplexes the information about the second portion of the precoding in a same symbol as the reference signal.

Aspect 16 is a method of wireless communication at a wireless device, comprising: receiving a precoded data transmission that is precoded based on a channel measurement and based on data comprised in the data transmission; and decoding the precoded data transmission based on the channel measurement and the data comprised in the data transmission.

Aspect 17 may be combined with aspect 16 and further includes receiving a reference signal associated with a precoded data transmission; and estimating a channel based on the reference signal to determine a first portion of a precoder function applied to the precoded data transmission, where the wireless device uses a channel estimation to decode the precoded data transmission.

Aspect 18 may be combined with any of aspects 16-17 and includes that the reference signal comprises a DMRS.

Aspect 19 may be combined with any of aspects 16-18 and further includes receiving information about a second portion of a precoder function that varies per symbol and is based on the data to be transmitted in each of a plurality of symbols of the data transmission, where the wireless device decodes the precoded data transmission based on the channel estimation and the received information.

Aspect 20 may be combined with any of aspects 16-19 and includes that the first portion of the precoder function varies based on a channel measurement over multiple symbols and the second portion of the precoder function varies based on data to be transmitted in each symbol.

Aspect 21 may be combined with any of aspects 16-20 and includes that the information about the second portion of the precoder function is precoded based on the first portion of the precoder function and not based on the second portion of the precoder function.

Aspect 22 may be combined with any of aspects 16-21 and includes that the wireless device receives the reference signal in a first symbol and receives the information about the second portion of the precoder function in a second symbol.

Aspect 23 may be combined with any of aspects 16-21 and includes that the wireless device receives the information about the second portion of the precoder function in a same symbol as the reference signal.

Aspect 24 is a method of wireless communication at a wireless device, comprising: performing a channel measurement; applying a precoder function to generate a precoded data transmission, the precoder function having a first portion based on the channel measurement and a second portion based on data to be transmitted; and transmitting the precoded data transmission.

Aspect 25 may be combined with aspect 24 and further includes determining the first portion of the precoder function based on the channel measurement; and determining the second portion of the precoder function based on the data to be transmitted in each symbol.

Aspect 26 may be combined with any of aspects 24-25 and includes that the wireless device applies the precoder function per symbol based on the data to be transmitted in a corresponding symbol.

Aspect 27 may be combined with any of aspects 24-26 and further includes determining whether interference will be constructive or destructive for the data, where the second portion of the precoder function is further based on whether the interference will be constructive or destructive for the data.

Aspect 28 may be combined with any of aspects 24-27 and includes that the second portion of the precoder function nulls destructive interference for the precoded data transmission.

Aspect 29 may be combined with any of aspects 24-27 and includes that the second portion of the precoder function adjusts a data transmission to change destructive interference into constructive interference for the precoded data transmission.

Aspect 30 may be combined with any of aspects 24-29 and includes that the second portion of the precoder function rotates a data transmission relative to destructive interference.

Aspect 31 may be combined with any of aspects 24-30 and includes that the first portion of the precoder function comprises a first function that varies based on the channel measurement over multiple symbols and the second portion of the precoder function comprises a second function that varies based on the data to be transmitted in each symbol.

Aspect 32 may be combined with any of aspects 24-31 and further includes calculating, for each of multiple frequency tones, a data correlation across a plurality of MIMO layers; averaging the data correlation over the multiple frequency tones to generate a data correlation matrix; and determining, based on the data correlation matrix, a nulling matrix or a rotation matrix for the second function that varies based on the data to be transmitted in each symbol.

Aspect 33 may be combined with any of aspects 24-32 and further includes precoding a reference signal associated with the precoded data transmission based on the first portion of the precoder function and not the second portion of the precoder function; and transmitting the reference signal.

Aspect 34 may be combined with any of aspects 24-33 and includes that the reference signal comprises a DMRS.

Aspect 35 may be combined with any of aspects 24-34 and further includes transmitting, to a receiver, information about the second portion of the precoder function to be applied to the precoded data transmission.

Aspect 36 may be combined with any of aspects 24-35 and includes that the second portion comprises a function based on the data for each symbol of the precoded data transmission.

Aspect 37 may be combined with any of aspects 24-36 and further includes precoding the information based on the first portion of the precoder function and not based on the second portion of the precoder function.

Aspect 38 may be combined with any of aspects 24-37 and includes that the wireless device transmits the reference signal in a first symbol, transmits the information about the second portion of the precoder function in a second symbol, and transmits the precoded data transmission in one or more additional symbols.

Aspect 39 may be combined with any of aspects 24-37 and includes that the wireless device multiplexes the information about the second portion of the precoder function in a same symbol as the reference signal.

Aspect 40 is a method of wireless communication at a wireless device, comprising: receiving a reference signal associated with a precoded data transmission; estimating a channel based on the reference signal to determine a first portion of a precoder function applied to the precoded data transmission; receiving information about a second portion of the precoder function that varies per symbol; and decoding the precoded data transmission using the first portion and the second portion of the precoder function.

Aspect 41 may be combined with aspect 40 and includes that the first portion of the precoder function varies based on a channel measurement over multiple symbols and the second portion of the precoder function varies based on data to be transmitted in each symbol.

Aspect 42 may be combined with any of aspects 40-41 and includes that the reference signal comprises a DMRS.

Aspect 43 may be combined with any of aspects 40-42 and includes that the information about the second portion of the precoder function is precoded based on the first portion of the precoder function and not based on the second portion of the precoder function.

Aspect 44 may be combined with any of aspects 40-43 and includes that the wireless device receives the reference signal in a first symbol and receives the information about the second portion of the precoder function in a second symbol.

Aspect 45 may be combined with any of aspects 40-43 and includes that the wireless device receives the information about the second portion of the precoder function in a same symbol as the reference signal.

Aspect 46 is an apparatus for wireless communication including at least one processor coupled to a memory and configured to implement a method as in any of aspects 1-16 or 24-39.

Aspect 47 is an apparatus for wireless communication including means for implementing a method as in any of aspects 1-16 or 24-39.

Aspect 48 is a computer-readable medium storing computer executable code, the code when executed by at least one processor causes the at least one processor to implement a method as in any of aspects 1-16 or 24-39.

Aspect 49 is an apparatus for wireless communication including at least one processor coupled to a memory and configured to implement a method as in any of aspects 17-22 or 40-45.

Aspect 50 is an apparatus for wireless communication including means for implementing a method as in any of aspects 17-22 or 40-45.

Aspect 51 is a computer-readable medium storing computer executable code, the code when executed by at least one processor causes the at least one processor to implement a method as in any of aspects 17-22 or 40-45.

What is claimed is:

1. An apparatus for wireless communication at a wireless device, comprising:
    at least one memory; and
    at least one processor coupled to the at least one memory and configured to:
        calculate, for each of multiple frequency tones, a data correlation across a plurality of multiple input multiple output (MIMO) layers;
        average the data correlation over the multiple frequency tones to generate a data correlation matrix;
        determine, based on the data correlation matrix, a nulling matrix or a rotation matrix that varies based on content of data that is to be transmitted;
        apply precoding to payload data to obtain a precoded data transmission, wherein the precoding includes a first portion that is a first function of a channel measurement and a second portion that is a second function of the content of the data, wherein the data is associated with the payload data, and wherein the second portion is based on the nulling matrix or the rotation matrix;
        transmit a reference signal associated with the precoded data transmission, wherein the reference signal is precoded based on the channel measurement and not the second portion of the precoding;
        transmit information about the second portion of the precoding that is the second function of the content of the data and to be applied to the precoded data transmission; and
        transmit the precoded data transmission.

2. The apparatus of claim 1, wherein the at least one processor is further configured to apply the precoding per symbol based on the content of the data to be transmitted in a corresponding symbol.

3. The apparatus of claim 1, wherein the at least one processor is further configured to apply the second portion of the precoding further based on whether interference will be constructive or destructive for the data.

4. The apparatus of claim 3, wherein the second portion of the precoding at least partially nulls destructive interference for the precoded data transmission.

5. The apparatus of claim 3, wherein the second portion of the precoding adjusts a data transmission to change destructive interference into constructive interference for the precoded data transmission.

6. The apparatus of claim 1, wherein the second portion of the precoding rotates a data transmission relative to destructive interference.

7. The apparatus of claim 1, wherein the first portion of the precoding varies based on the channel measurement over multiple symbols and the second portion of the precoding varies based on the content of the data to be transmitted in each symbol.

8. The apparatus of claim 1, wherein the at least one processor is further configured to:
    precode the reference signal associated with the precoded data transmission based on the first portion of the precoding and not the second portion of the precoding.

9. The apparatus of claim 8, wherein the reference signal comprises a demodulation reference signal (DMRS).

10. The apparatus of claim 1, wherein the second portion comprises a per symbol function based on the data for each of a plurality of symbols of the precoded data transmission.

11. The apparatus of claim 1, wherein the at least one processor is further configured to precode the information about the second portion based on the first portion and not based on the second portion of the precoding.

12. The apparatus of claim 11, wherein the at least one processor is further configured to transmit the reference signal in a first symbol, transmit the information about the second portion of the precoding in a second symbol, and transmit the precoded data transmission in one or more additional symbols.

13. The apparatus of claim 11, wherein the wireless device multiplexes the information about the second portion of the precoding in a same symbol as the reference signal.

14. An apparatus for wireless communication at a wireless device, comprising:
at least one memory; and
at least one processor coupled to the at least one memory and configured to:
receive information about a second portion of a precoder function to be applied to a precoded data transmission, wherein the second portion is selected based on content of data comprised in the precoded data transmission;
receive a reference signal associated with the precoded data transmission, wherein the reference signal is precoded based on a channel measurement and not the second portion of the precoder function;
receive the precoded data transmission that is precoded based on a first portion of the precoder function that is a first function of the channel measurement and the second portion of the precoder function that is a second function of the content of the data, wherein the second portion is based on a nulling matrix or a rotation matrix that varies based on the content of the data comprised in the precoded data transmission, wherein the nulling matrix or the rotation matrix is based on data correlation matrix, wherein the data correlation matrix is based on an average of a data correlation across multiple frequency tones, and wherein the data correlation is for each of the multiple frequency tones across a plurality of multiple input multiple output (MIMO) layers; and
decode the precoded data transmission based on the channel measurement and the information indicating the second portion of the precoder function that is the second function of the content of the data comprised in the precoded data transmission.

15. The apparatus of claim 14, wherein the at least one processor is further configured to:
estimate a channel based on the reference signal to determine the first portion of the precoder function applied to the precoded data transmission, wherein the wireless device uses a channel estimation to decode the precoded data transmission.

16. The apparatus of claim 15, wherein the reference signal comprises a demodulation reference signal (DMRS).

17. The apparatus of claim 15, wherein the second portion of the precoder function that varies per symbol and is based on the data to be transmitted in each of a plurality of symbols of the precoded data transmission.

18. The apparatus of claim 17, wherein the channel measurement is over multiple symbols, wherein the data is transmitted in each symbol, wherein the first portion of the precoder function varies based on the channel measurement over the multiple symbols and the second portion of the precoder function varies based on the data transmitted in each symbol.

19. The apparatus of claim 17, wherein the information about the second portion of the precoder function is precoded based on the first portion of the precoder function and not based on the second portion of the precoder function.

20. The apparatus of claim 19, wherein the wireless device receives the reference signal in a first symbol and receives the information about the second portion of the precoder function in a second symbol.

21. The apparatus of claim 19, wherein the wireless device receives the information about the second portion of the precoder function in a same symbol as the reference signal.

22. A method of wireless communication at a wireless device, comprising:
calculating, for each of multiple frequency tones, a data correlation across a plurality of multiple input multiple output (MIMO) layers;
averaging the data correlation over the multiple frequency tones to generate a data correlation matrix;
determining, based on the data correlation matrix, a nulling matrix or a rotation matrix that varies based on content of data that is to be transmitted;
applying precoding to payload data to obtain a precoded data transmission, wherein the precoding includes a first portion that is a first function of a channel measurement and a second portion that is a second function of the content of the data, wherein the data is associated with the payload data, and wherein the second portion is based on the nulling matrix or the rotation matrix;
transmitting a reference signal associated with the precoded data transmission, wherein the reference signal is precoded based on the channel measurement and not the second portion of the precoding;
transmitting information about the second portion of the precoding that is the second function of the content of the data and to be applied to the precoded data transmission; and
transmitting the precoded data transmission.

23. The method of claim 22, further comprising applying the second portion of the precoding further based on whether interference will be constructive or destructive for the data.

24. The method of claim 22, further comprising:
precoding the reference signal associated with the precoded data transmission based on the first portion of the precoding and not the second portion of the precoding.

25. A method of wireless communication at a wireless device, comprising:
receiving information about a second portion of a precoder function to be applied to a precoded data transmission, wherein the second portion is selected based on content of data comprised in the precoded data transmission;
receiving a reference signal associated with the precoded data transmission, wherein the reference signal is precoded based on a channel measurement and not the second portion of the precoder function;
receiving the precoded data transmission that is precoded based on a first portion of the precoder function that is a first function of the channel measurement and the second portion of the precoder function that is a second function of the content of the data, wherein the second portion is based on a nulling matrix or a rotation matrix that varies based on the content of the data comprised in the precoded data transmission, wherein the nulling matrix or the rotation matrix is based on data correlation matrix, wherein the data correlation matrix is based on an average of a data correlation across multiple frequency tones, and wherein the data correlation is for each of the multiple frequency tones across a plurality of multiple input multiple output (MIMO) layers; and decoding the precoded data transmission based on the channel measurement and the information indicating the second portion of the precoder function that is the second function of the content of the data comprised in the precoded data transmission.

26. The method of claim 25, further comprising:

estimating a channel based on the reference signal to determine the first portion of the precoder function applied to the precoded data transmission, wherein the wireless device uses a channel estimation to decode the precoded data transmission.

27. The method of claim 26, wherein the second portion of the precoder function that varies per symbol and is based on the data to be transmitted in each of a plurality of symbols of the precoded data transmission, wherein the wireless device decodes the precoded data transmission based on the channel estimation and the received information.

28. The method of claim 27, wherein the channel measurement is over multiple symbols, wherein the data is transmitted in each symbol, wherein the first portion of the precoder function varies based on the channel measurement over the multiple symbols and the second portion of the precoder function varies based on the data transmitted in each symbol.

29. The method of claim 22, wherein the second portion comprises a per symbol function based on the data for each of a plurality of symbols of the precoded data transmission.

30. The method of claim 22, further comprising:

precoding the information about the second portion based on the first portion and not based on the second portion of the precoding.

* * * * *